(12) United States Patent
Schilling et al.

(10) Patent No.: US 10,775,974 B2
(45) Date of Patent: Sep. 15, 2020

(54) USER RESPONSIVE DYNAMIC ARCHITECTURE

(71) Applicant: Vignet Incorporated, Fairfax, VA (US)

(72) Inventors: Josh Schilling, Salem, OR (US); Dave Klein, Oakton, VA (US); Praduman Jain, Fairfax, VA (US)

(73) Assignee: Vignet Incorporated, Fairfax, VA (US)

( * ) Notice: Subject to any disclaimer, the term of this patent is extended or adjusted under 35 U.S.C. 154(b) by 0 days.

(21) Appl. No.: 16/101,261

(22) Filed: Aug. 10, 2018

(65) Prior Publication Data

US 2020/0050330 A1  Feb. 13, 2020

(51) Int. Cl.
*G06F 3/0484* (2013.01)
*G06F 8/38* (2018.01)
(Continued)

(52) U.S. Cl.
CPC .......... *G06F 3/0484* (2013.01); *G06F 3/0482* (2013.01); *G06F 8/38* (2013.01); *G06N 20/00* (2019.01)

(58) Field of Classification Search
CPC ........ G06F 8/38; G06F 3/0484; G06F 3/0482; G06N 20/00
See application file for complete search history.

(56) References Cited

U.S. PATENT DOCUMENTS 6,019,777 A  2/2000 Mackenzie
6,039,688 A  3/2000 Douglas et al.
(Continued)

FOREIGN PATENT DOCUMENTS

EP   2545468       1/2016
WO   WO 2011112556 9/2011
WO   WO 2012078753 6/2012

OTHER PUBLICATIONS

[No Author] "Methods for JITAIs Just in Time Adaptive Intervention," Nov. 9, 2016, retrieved on Nov. 9, 2016, retrieved from URL<https://community.isr.umich.edu/public/Default.aspx?alias=community.isr.umich.edu/public/jitai&>, 1 page.
(Continued)

*Primary Examiner* — Beau D Spratt
(74) *Attorney, Agent, or Firm* — Fish & Richardson P.C.

(57) ABSTRACT

A system and method for dynamically adjusting the architecture of an application on a device based on user responsiveness. The application determines relevant changes to apply based on the user's interactivity with the application through a plurality of inputs and data analysis. The application adapts the architecture to provide preferred application containers, features, workflow, and interface elements. User data, indicating characteristics of the user, is obtained and used to select adaptions to the user architecture through selection of specific application container units, application features, workflow segments and other elements. The application determines and selects the appropriate application container units, application feature, and workflow segments to vary the features available, the content displayed, the workflow of the application, the form of the content and the interface for different users. The dynamic architecture ensures continued engagement with the application by displaying interactive elements on an individual level on the device.

20 Claims, 30 Drawing Sheets

(51) Int. Cl.
  *G06F 3/0482*  (2013.01)
  *G06N 20/00*  (2019.01)

(56) References Cited

U.S. PATENT DOCUMENTS

| | | |
|---|---|---|
| 6,260,022 B1 | 7/2001 | Brown |
| 6,269,339 B1 | 7/2001 | Silver |
| 6,828,992 B1 | 12/2004 | Freeman |
| 6,904,408 B1 | 6/2005 | McCarthy |
| 7,076,534 B1 | 7/2006 | Cleron et al. |
| 7,086,007 B1 | 8/2006 | Bushey |
| 7,330,717 B2 | 2/2008 | Gidron et al. |
| 7,935,613 B2 | 5/2011 | Gizewski |
| 8,347,263 B1 | 1/2013 | Offer |
| 8,997,038 B2 | 3/2015 | Becker |
| 9,134,964 B2 | 9/2015 | Hirsch |
| 9,170,800 B2 | 10/2015 | Lang |
| 9,361,011 B1 | 6/2016 | Burns |
| 9,426,433 B1 | 8/2016 | Mazzarella |
| 9,461,972 B1 | 10/2016 | Mehta |
| 9,715,370 B2 | 7/2017 | Friedman |
| 9,753,618 B1 | 9/2017 | Jain |
| 9,858,063 B2 | 1/2018 | Jain et al. |
| 9,983,775 B2 | 5/2018 | Jain et al. |
| 10,205,769 B2 | 2/2019 | Sehgal |
| 2001/0019338 A1 | 9/2001 | Roth |
| 2002/0022973 A1 | 2/2002 | Sun et al. |
| 2002/0157091 A1 | 10/2002 | DeMello et al. |
| 2003/0078960 A1 | 4/2003 | Murren et al. |
| 2003/0229522 A1 | 12/2003 | Thompson et al. |
| 2004/0216054 A1 | 10/2004 | Matthews |
| 2005/0050320 A1 | 3/2005 | Wassmann et al. |
| 2005/0086587 A1 | 4/2005 | Balz |
| 2005/0144072 A1 | 6/2005 | Perkowski et al. |
| 2005/0186550 A1 | 8/2005 | Gillani |
| 2005/0246304 A1 | 11/2005 | Knight et al. |
| 2006/0107219 A1 | 5/2006 | Ahya |
| 2006/0205564 A1 | 9/2006 | Peterson |
| 2006/0282516 A1 | 12/2006 | Taylor |
| 2007/0021984 A1 | 1/2007 | Brown |
| 2008/0005679 A1 | 1/2008 | Rimas-Ribikauskas |
| 2008/0034314 A1* | 2/2008 | Louch .................. G06F 8/60 715/778 |
| 2008/0126110 A1 | 5/2008 | Haeberle |
| 2008/0127040 A1 | 5/2008 | Barcellona |
| 2008/0177638 A1 | 7/2008 | Butler |
| 2008/0201174 A1 | 8/2008 | Ramasubramanian |
| 2008/0301118 A1 | 12/2008 | Chien |
| 2009/0024944 A1 | 1/2009 | Louch |
| 2009/0043989 A1 | 2/2009 | Yang |
| 2009/0076856 A1 | 3/2009 | Darby et al. |
| 2009/0119678 A1 | 5/2009 | Shih |
| 2009/0150814 A1 | 6/2009 | Eyer |
| 2009/0156190 A1 | 6/2009 | Fisher |
| 2009/0163182 A1 | 6/2009 | Gatti |
| 2009/0172002 A1 | 7/2009 | Ahmed |
| 2009/0248883 A1* | 10/2009 | Suryanarayana ....... G06F 9/451 709/229 |
| 2010/0041378 A1 | 2/2010 | Aceves |
| 2010/0122286 A1 | 5/2010 | Begeja |
| 2010/0179833 A1 | 7/2010 | Roizen et al. |
| 2010/0211941 A1 | 8/2010 | Roseborough |
| 2010/0333037 A1 | 12/2010 | Pavlovski |
| 2011/0126119 A1 | 5/2011 | Young |
| 2011/0200979 A1 | 8/2011 | Benson |
| 2012/0084399 A1 | 4/2012 | Scharber et al. |
| 2012/0102050 A1 | 4/2012 | Button |
| 2012/0215639 A1 | 8/2012 | Ramer et al. |
| 2012/0260294 A1 | 10/2012 | Reichardt et al. |
| 2012/0272156 A1 | 10/2012 | Kerger |
| 2013/0103749 A1* | 4/2013 | Werth .................. G06F 9/5072 709/203 |
| 2013/0110565 A1 | 5/2013 | Means |
| 2013/0145457 A1 | 6/2013 | Papakipos et al. |
| 2013/0166494 A1 | 6/2013 | Davis |
| 2013/0212487 A1 | 8/2013 | Cote |
| 2013/0238686 A1 | 9/2013 | O'Donoghue |
| 2013/0283188 A1 | 10/2013 | Sanghvi |
| 2014/0026113 A1 | 1/2014 | Farooqi |
| 2014/0033171 A1 | 1/2014 | Lorenz |
| 2014/0088995 A1 | 3/2014 | Damani |
| 2014/0100883 A1 | 4/2014 | Hamilton |
| 2014/0101628 A1 | 4/2014 | Almog |
| 2014/0109072 A1 | 4/2014 | Lang et al. |
| 2014/0109115 A1 | 4/2014 | Low |
| 2014/0109177 A1 | 4/2014 | Barton et al. |
| 2014/0156823 A1 | 6/2014 | Liu |
| 2014/0181715 A1 | 6/2014 | Axelrod |
| 2014/0187228 A1 | 7/2014 | Fisher |
| 2014/0240122 A1 | 8/2014 | Roberts |
| 2014/0273913 A1 | 9/2014 | Michel |
| 2014/0278536 A1 | 9/2014 | Zhang |
| 2014/0282061 A1 | 9/2014 | Wheatley et al. |
| 2014/0309868 A1 | 10/2014 | Ricci |
| 2014/0358482 A1 | 12/2014 | Sehgal |
| 2014/0365961 A1* | 12/2014 | Lefor ................ G06Q 10/0631 715/810 |
| 2015/0019342 A1 | 1/2015 | Gupta |
| 2015/0056589 A1 | 2/2015 | Zhang et al. |
| 2015/0074635 A1 | 3/2015 | Margiotta |
| 2015/0089224 A1 | 3/2015 | Beckman |
| 2015/0135160 A1 | 5/2015 | Gauvin |
| 2015/0148061 A1 | 5/2015 | Koukoumidis |
| 2015/0154002 A1 | 6/2015 | Weinstein et al. |
| 2015/0163121 A1 | 6/2015 | Mahaffey |
| 2015/0294090 A1 | 10/2015 | Kodiyan |
| 2016/0058287 A1 | 3/2016 | Dyell |
| 2016/0092339 A1 | 3/2016 | Straub |
| 2017/0048215 A1 | 2/2017 | Straub |
| 2017/0329483 A1* | 11/2017 | Jann .................... G06F 3/04845 |
| 2017/0329500 A1* | 11/2017 | Grammatikakis .. G06F 3/04845 |
| 2017/0344895 A1* | 11/2017 | Roy ........................ G06N 7/005 |
| 2017/0374178 A1* | 12/2017 | Sharma .................. H04L 67/36 |
| 2018/0121187 A1 | 5/2018 | Jain et al. |
| 2019/0026663 A1* | 1/2019 | Homeyer ........... G06Q 10/0633 |

OTHER PUBLICATIONS

[No Author], "KhanAcademic.org," retrieved on May 12, 2017, retrieved from URL<http://www.khanacademic.org>, 1 page.
Airwatch: "AirWatch Enterprise Mobility Management Demo," YouTube, Jul. 22, 2014, retrieved on May 3, 2017, retrieved from URL <https://www.youtube.com/watch?v=ucV1n4-tgk>, 1 page.
Airwatch: "Airwatch Laptop Management Demo," YouTube, Oct. 3, 2014, retrieved on May 3, 2017, retrieved from URL<https://www.youtube.com/watch?v=3gHfmdVZECM>, 1 page.
Conner, "Experience Sampling and Ecological Momentary Assessment with Mobile Phones," 2015, retrieved on May 3, 2017, retrieved from URL<http://www.otago.ac.nz/psychology/otago047475.pdf>, 4 pages.
Guyot, "Apple's ResearchKit: Our Complete Overview," Mar. 9, 2015, retrieved on Mar. 30, 2020, retrieved from URL<https://www.macstories.net/news/apples-researchkit-our-complete-overview>, 8 pages.
Henze et al., "Push the study to the App store: evaluating off-screen visualizations for maps in the android market," Proceedings of the 12th Conference on Human-Computer Interaction with Mobile Devices and Services, Lisbon, Portugal, Sep. 7-10, 2010, 373-374.
Heron, "Ecological Momentary Intervention [EMI]: Incorporating mobile technology into a disordered eating treatment program for college women," Psychology—Dissertations, paper 157, 2011.
Lunn et al., "Using Mobile Technology to Engage Sexual and Gender Minorities in Clinical Research," PLOS ONE, May 2, 2019, 14(5), 19 pages.
Matthews, "Johns Hopkins Researchers to Use Apple Watch Data to Study Epilepsy," Oct. 15, 2015, retrieved on Mar. 30, 2020, retrieved from URL<https://hub.jhu.edu/2015/10/15/apple-watch-epiwatch/>, 3 pages.
Milward, "Ecological momentary assessment," Jul. 2015, retrieved on May 12, 2017, retrieved from URL <https://www.addiction-ssa.

(56) References Cited

OTHER PUBLICATIONS org/commentary/emerging-research-methods-series-ecological-momentary-assessment>, 3 pages.

Pogue, "Apple's First 5 Health ResearchKit Apps in Brief," Jul. 1, 2015, retreived on Mar. 30, 2020, retrieved from URL<https://www.scientificamerican.com/article/pogue-apples-first-5-health-researchkit-apps-in-brief/>, 4 pages.

Runyan et al., "Virtues, ecological momentary assessment/intervention and smartphone technology," Frontiers in Psychology, May 2015, 6:481, 24 pages.

Taivan et al., "Application Diversity in Open Display Networks," Proceedings of the International Symposium on Pervasive Displays, Copenhagen, Denmark, Jun. 2014, 68-73.

West et al., "There's an App for That: Content Analysis of Paid Health and Fitness Apps," Journal of Medical Internet Research, May-Jun. 2012, 14(3): e72, 12 pages.

\* cited by examiner

USER RESPONSIVE DYNAMIC ARCHITECTURE

FIELD OF THE INVENTION

This present invention relates to the field of user responsive dynamic architecture (URDA) and more specifically to user responsive dynamic architecture that senses changes through a plurality of networked inputs and adapts real-time through-out its continued engagement on a personalized individual level.

BACKGROUND OF THE INVENTION

Current client-side applications and related architectures provide limited ability to deploy an application to a device (i.e. mobile phone) which can be deployed and used by many users, and yet flexible enough to vary the visual characteristics, the functional aspects, and the flow or of the application to each individual user.

As seen in FIG. 1, a standard deployed client-side system 5 includes an architecture 20 of a client device and application with two primary inputs. The first input is the user 10. The user 10 input effects the presentation 22 of the application, which has user interface components 24 that presents data from the physical user and offers ways for the user to respond. The presentation 22 also includes the user interface process components 26.

The second input is an external system 14 that is made up of one or more devices that collect data (i.e. sensing devices) or service consumers 16. The external systems 14 are transferred into the service layer 30 using the service interfaces 32 (i.e. an API to mobile phone or library). The services layer 30 then decouples the information and translates a message using the message types 34. After the message type 34 decouples the information it is placed into the system 5 to enable logical decision making by the app. The services layer 30 has the ability to pass the decoupled information to the business layer 40 or the data layer 50. The business layer 40 includes the application facade 42 on the client or user device 20, and the business workflow 44, business components 46 and business entities 48. The data layer 50 is composed of data access components 52, data helpers/utilities 54, and service agents and tools 56. There is local data 58 stored on the client device and application 20.

The cross-cutting section 60 of the device and application are aspects needed across the entire system 5. The cross-cutting section 60 includes security 62, configuration/operational management 64, communication 66, and regulatory 68. These layers 62, 64, 66, 68 can hold non-functional requirements, that are dependent on the area in which the application is being utilized or the functional needs of the device 20. Security 62 is what is needed for the application and its data in-flight and at-rest to enforce policies, privacy and authentication rules. Configuration/Operational management 64 is what is needed to run the application across different regions, deployments endpoints and platforms utilized for distributions and defines defaults for requirements. Communication 66 is related to application interface requirements and what is needed for transport and application level communication in controlling the bandwidth, retries and authentication needs of the system, in addition this may be the user facing language the device displays, depending on the operational managements determination about location. Regulatory 68 may be the local regulation and policies enforcement as required to be followed in the specific region the application is operating in which can define default policies during initial use and be dynamically adjusted based on movement by the user through different geographies.

In addition, the client-loaded equipment and application 20 may interact with a remote exchange 19 between the deployed application and the remote server infrastructure 70. The remote server infrastructure 70 may consist of multiple endpoints including one or more remote data sources 71 and web services 75. The remote data sources layer 71 gives data access 73 to external data storage 70 which is used as a data lake cloud-based storage embodying the local data 58 across multiple deployments of the client-loaded equipment and application 20. The web service layer 75 may pass through the service agents/tools 56 of the application and is often seen as the notification and service agent to manage data across deployments and the availability of the remote data sources 71. The remote server's web services 75 is often an external system or data synchronization 79 from the back-end side of the cloud-based server used in logging, analytics, and data synchronization across deployments. Web Services 75 includes services 77 and synchronization 79.

However, current systems often provide a single implementation specific application for a given approach leaving little room for adaptation of the client application based on the user. This results in a multiple deployments of single implementation specific applications albeit to a common remote server infrastructure, sometimes known as suite of applications. These applications generate many requests to the same server, utilize large sections of code that is duplicated across deployments with no provision to minimize server calls, storage space, and consolidation needs for storage space, processing and bandwidth. Therefore, technical improvements and solutions are needed to overcome these technical problems while accommodating the evolving needs of users in order to better manage memory, storage, processing, network utilization, quality, risk of security exploits and usability through a managed footprint in terms of scope and scale. The systems and methods of the present invention provide such improvements.

SUMMARY OF INVENTION

The present invention provides a computing device comprised of at least one processor and computer-readable storage devices for storing instructions that, when the instructions are executed by the processors, cause the computing device to perform operations comprising: (a) receiving, by the computing device and over a computer network, a first set of instructions stored on the computer-readable devices, the first set of instructions including an initial application configuration, at least one application container unit, a plurality of application feature units, and a plurality of application workflow segments; (b) the initial application configuration identifying a first application container unit ("ACU"), a first set of application feature units ("AFU"s) from the plurality of AFUs, and a first workflow set from the plurality of workflow segments for the computing device to use; (c) capturing user interaction data with the initial application configuration; (d) analyzing the user interaction data with the initial application configuration; and (e) updating the initial application configuration based on the user interaction data to a second application configuration, which causes the set of instructions to use a second set of AFUs from the plurality of AFUs and a second workflow set from the plurality of workflow segments. The instructions may further comprise retrieving an additional ACU, AFU, or workflow segment from the computer network and updating the application configuration with the retrieved ACU, AFU, or workflow segment by updating the application configuration to utilize the retrieved ACU, AFU or workflow segment. The instructions may further comprise retrieving an updated version of an ACU, AFU, or workflow segment from the computer network and updating the application configuration with the updated version of the ACU, AFU, or workflow segment. The application configuration may be as portion or subset of code and updating the application configuration consists of updating the subset of code. The application configuration may be contained within a configuration file and updating the application configuration consists of updating the configuration file. The application configuration may be contained within a reference table and updating the application configuration consists of updating the reference table.

The present invention may also provide a method performed by a computer system, the method comprising various steps including: (a) transmitting, by the computer system, a software application containing an application configuration, at least one application container unit, a plurality of application feature units and a plurality of workflow segments, to a remote device; (b) assigning, within the application configuration, an initial application container unit selected from the at least one application container unit, at least one initial application feature unit selected from the plurality of application feature units, at least one initial workflow segment selected from the plurality of workflow segments; (c) capturing user interaction data during use of the software application on the remove device; (d) analyzing the user interaction data; (e) determining a preferred configuration of ACU, AFU, workflow; and (f) updating the configuration code portion, based on the user interaction data, for the software application to utilize a second ACU from the at least one ACU, a second AFU from the plurality of AFUs, or a second workflow set from the plurality of workflow segments. Additional steps may include retrieving an additional ACU, AFU, or workflow segment from a computer network and updating the application configuration to utilize the retrieved ACU, AFU, or workflow segment. Further, the invention may include the additional step of updating or retrieving an updated version of an ACU, AFU, or workflow segment already resident on the device from the computer network and updating the application configuration with the updated version of the ACU, AFU, or workflow segment. The invention may include the additional set of updating the application configuration to use a new or updated ACU, AFU, or workflow segment consists of updating the subset of code, updating a configuration file, or updating a reference table to update the application configuration.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF EXEMPLARY EMBODIMENTS

Hereinafter, aspects of the methods and associated systems in accordance with various embodiments of the invention will be described. As used herein, any term in the singular may be interpreted to be in the plural, and alternatively, any term in the plural may be interpreted to be in the singular. It is appreciated that features of one embodiment as described herein may be used in conjunction with other embodiments. The present invention can be more fully understood by reading the following detailed description together with the accompanying drawings (FIGS. 2-15), in which like reference indicators are used to designate like elements.

Improved Client-Side Architecture Structure

Figure 1:
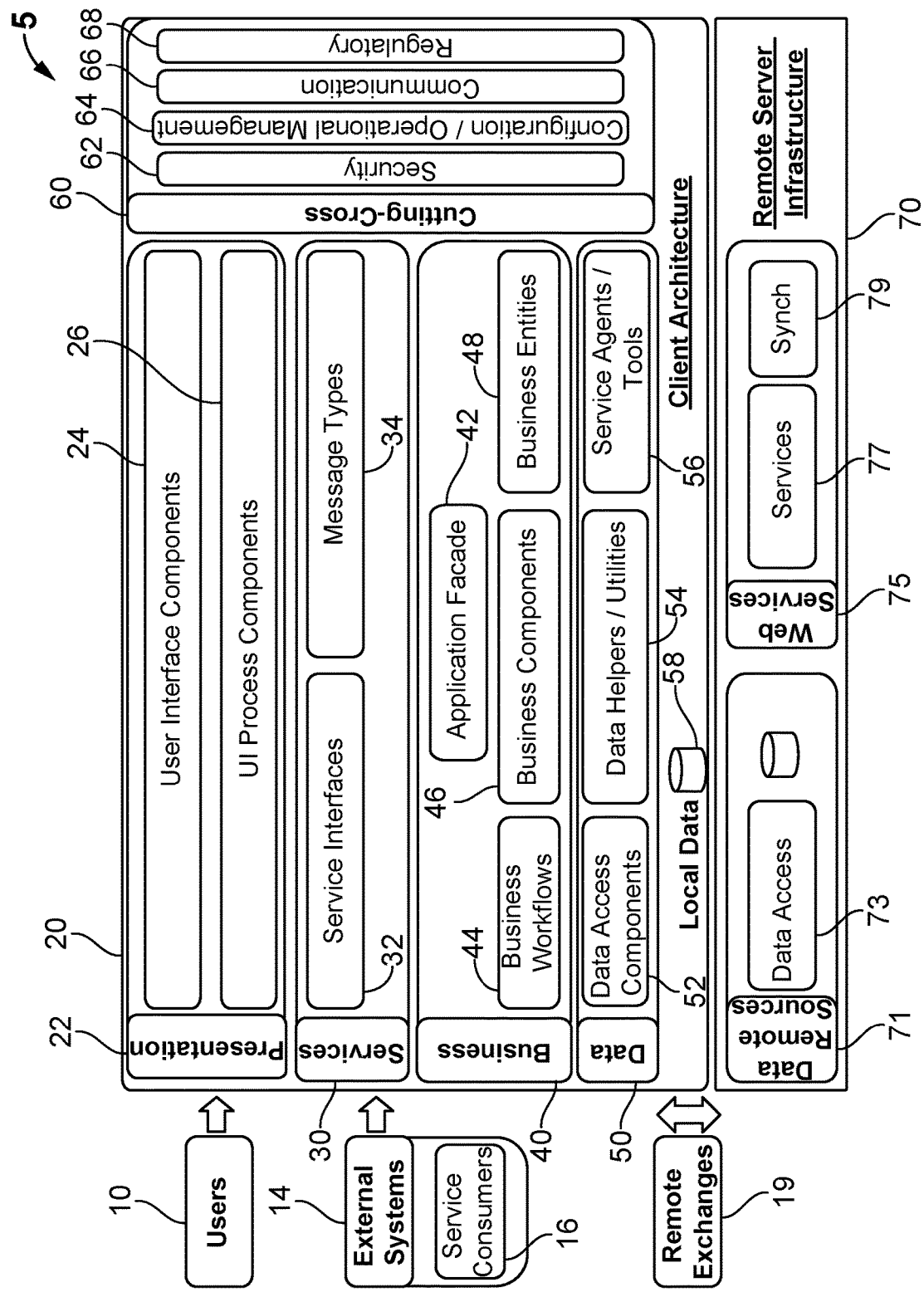
FIG. 1 depicts a standard architecture of a client device with an installed client software application.
Figure 2:
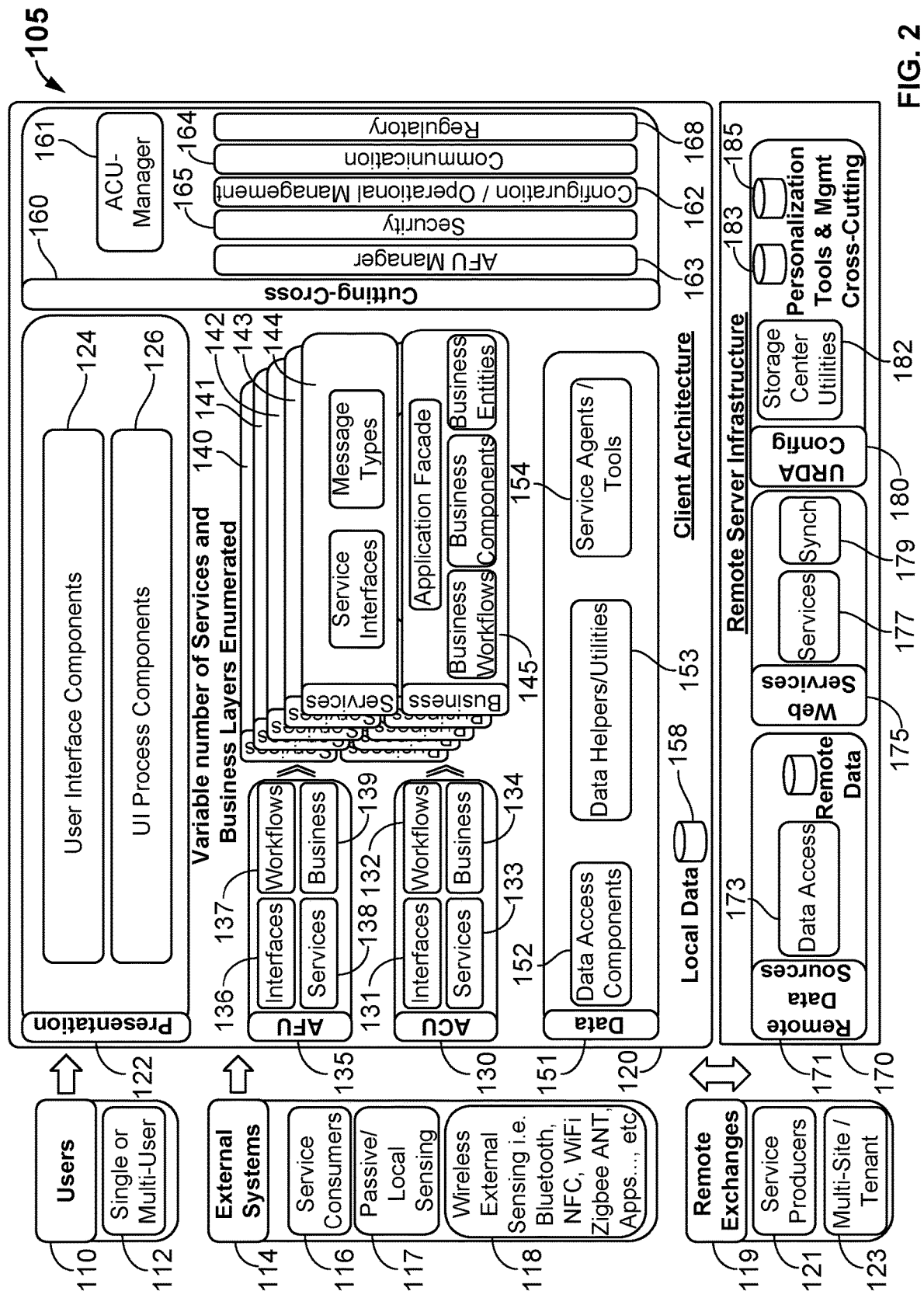
FIG. 2 depicts an exemplary architecture of a client device software application.

FIG. 2 shows the exemplary design of the user responsive dynamic architecture system 105, providing a client architecture 120 of a client device and application as described herein.

There are two direct inputs into the application, the users 110 and external systems 114. The user can be a single user 110 or multiple users 112 of a device. The user inputs 110, 112 can affect the presentation layer 122, which has user interface components 124 and UI process components 126. This exemplary system design 105 allows for multiple users 112 to use the same private device and determine based on device information what information to store and when to reset the application to secure information.

The external systems 114 are sensing devices that directly transfer data into the application container unit (ACU) 130 or the application feature unit (AFU) 135 depending on the type of sensing device connected. The external systems 114 can include service consumers 116, passively or locally sensed data 117 from the device, and wireless external sensing of data from disparate external device sources and transports 118 including Bluetooth, Near-Field Communication, Wi-Fi, Zigbee, ANT and other device application sharing data. The data from the external systems 114 is transferred and the AFU 135 and ACU 130 are able to read different sensors with different functionalities based on which sensor is installed on the user device. The AFU 135 and ACU 130 layer allow the interjection of logic between what data is transferred and what data is presented based on specific users. In choosing which business and services to run based on the external systems input 114 a variable number of services and business layers 140, 141, 142, 143, 144, 145 are available and sections from each layer are stitched together to make up the optimal AFU 135 and ACU 130 for the current user. Depending on the data obtained from the sensing devices 117, 118 the AFU 135 and ACU 130 will select any variable number of interfaces 131, 136, workflows 132, 137, services 133, 138 and business layers 134, 139 that are optimized for the specific user. The AFU 135 and ACU 130 implemented or active within the installable application on the client device 120 are changed and chosen based on user inputs and events as well as the systems smart machine learning and testing for an optimized deployment.

The AFU 135 and ACU 130 transfer information to and from the data layer 151. The data layer 151 is composed of data access components 152, data helpers/utilities 153, and service agents and tools 154. The purpose of this layer is to support data usage, latency and bandwidth requirements. This data is accessible to help fulfil the higher layer needs of ACU 130 and AFU 135. Local data 158 is stored on the client device 120.

What will be further detailed below, when the application and architecture of the present invention are first installed the initial ACU 130 and AFU 135 are determined through the registration process. The registration process can be curated by the user's selection choices when the user first installs the application deployment on the device, or through a pre-configuration, such as a sign up/invite code that assist in a preselected choice of the starting ACU 130 (i.e. a specific invite code may be given through a healthcare professional's recommendation to tailor the choices first offered specific to the user perceived needs). The initial selected or identified ACU 130 and AFU 135 will be further optimized through usage of the application to determine the correct services and business layer the device will choose to translate the user input.

The cross-cutting section 160 of the client architecture 120 is managed by the ACU Manager 161. The ACU Manager 161 oversees the AFU Managers 163, Security 165, configuration/operation management 162, communication 164, and regulatory 168. The ACU Manager 161 manages each cross-cutting layer 165, 162, 164, 163, 168 based on the particular environment of the device (i.e. whether or not the device is a public tablet used in a public place that private data should not be stored on).

The remote server infrastructure 170 includes remote data sources 171, web services 175 and URDA configuration 180. The URDA configuration 180 holds the stock distribution storage center utilities 182 and the personalization tools 183 and management cross cutting 185. The stock distribution storage center 182 provides the ability to place all the different aspects of the configured application that is to be deployed globally into separate packages that the application can be individually turned on and off as it is customized further through user interaction, administrative provisioning and machine learning. This allows a single deployment of the application across a multitude of platforms from web to mobile to privately developed solutions like kiosks and gateway devices, such as keeping the same bundle ID in the app store can give development and operations to the ability to do controlled launches and meet the requirements of different geographies while creating a streamline efficient application. The entire application deployment is then one architecture that is localized to allow for greater application efficiency. The stock distribution storage center allows different AFUs 135 to be turned off without effecting the deployed application as a whole.

When the application and related architecture are first installed on the user device, the initial deployment includes an ACU 130 and AFU 135 and one or more initial layers (i.e. 140, 141) which are available to the ACU 130 and AFU 135. These initial layers 140, 141 will be added to after the registration process and initial user interaction. In addition, the presentation layer 122, Data layer 151, and cross-cutting section 160 are all present in an initial deployment form and may be updated or enhanced after initial deployment.

The exemplary client architecture is not limited to a mobile application but may be placed on other processor-based devices such as wearables, gateway hubs, and web servers accessible through browser interfaces and other utilities. The customization offered to the user is not limited to a mobile screen display, but rather any electronic method utilized to provide discernable access in any medium such as file output, audible feedback, vibration, sight through drawn or lights and arrangement of, smell or release of, and mouth-based interfaces.

The present invention provides an exemplary Improved Client-Side Architecture which includes a computing device comprising at least one processor, and one or more computer-readable storage devices for storing instructions. The instructions when executed by the processor, cause the computing device to perform operations comprising of receiving or modifying/reassigning, by the computing device and over a computer network, a set of instructions stored on the computer-readable devices. The first set of instructions when received include at least one ACU, a plurality of AFUs, and a plurality of application workflow segments. The set of instructions identifying a first ACU, a first set of AFUs from the plurality of AFUs, and a first workflow set from the plurality of workflow segments for the computing device to use. When modifying/reassigning the set of instructions—during continued/ongoing usage of the application, based on user data, for the computing device to use a second ACU, a second set of AFUs from the plurality of AFUs, or a second workflow set from the plurality of workflow segments (ACU/AFU/workflow resident on the computing device). The present invention provides a dynamic real time on the fly change of ACU/AFU/workflow without needing to run a software update to update the application to provide updated ACU/AFU/workflows.

Figure 3:
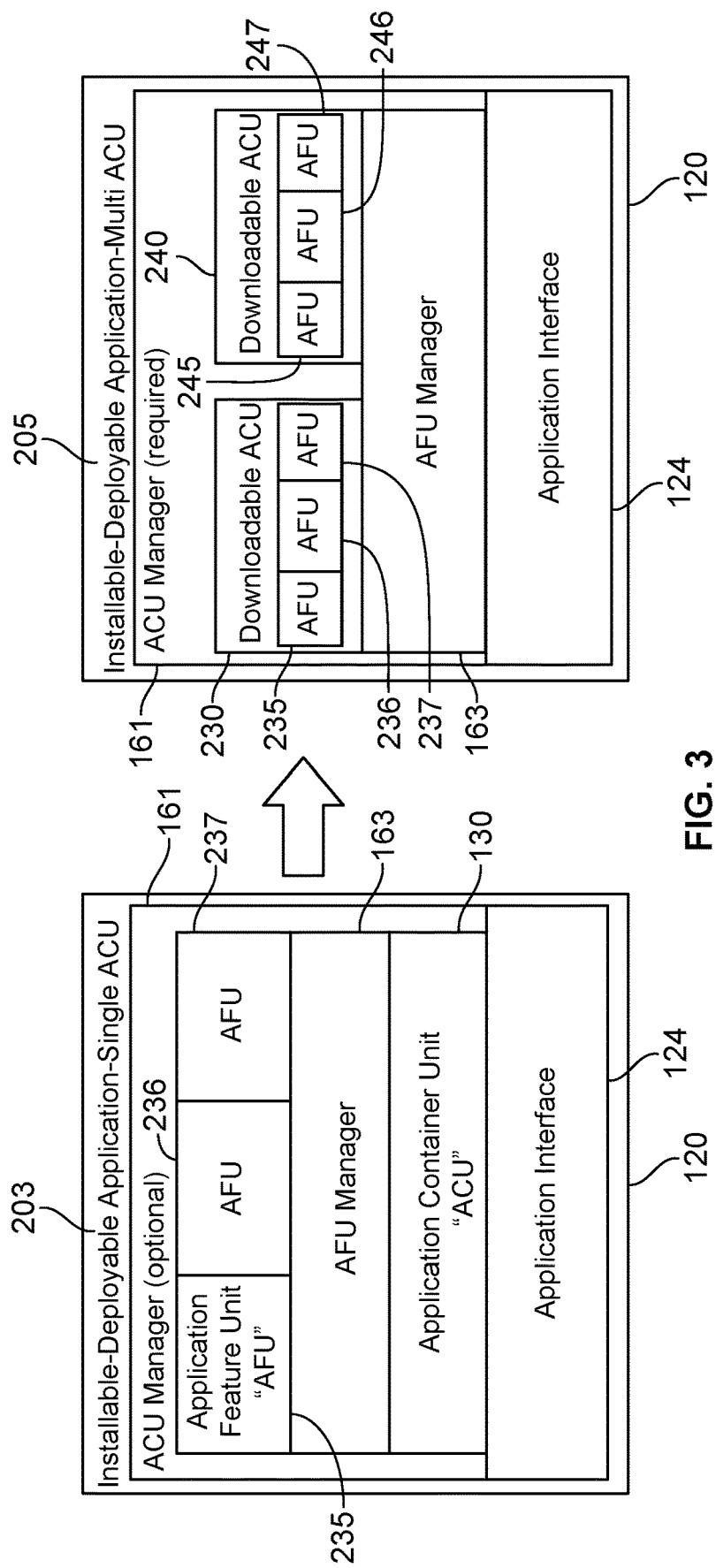
FIG. 3 depicts an installable deployable application on the device.

FIG. 3 shows the installable-deployable application 120 on the device. The deployable application 120 can run a single-ACU 203 or a multi-ACU 205. The single-ACU 203 has an optional ACU manager 161 that oversees the AFU manager 163. AFU manager 163 manages AFU 235,236, 237. The AFU manager 163 works with ACU 130 to display the optimal content on the user device. The system will use the ACU manager 161 in and the application interface 124 to determine what AFU or ACU to display information on the user device.

The deployable application 120 may also run a multi-ACU 205. The multi-ACU 205 has an ACU manager 161 that manages downloadable ACU 230, downloadable ACU 240, and the AFU manger 163. Downloadable ACU 230 includes AFU 235, 236, 237. Downloadable ACU 240 includes AFU 245, 246, 247. The AFU manager 163 runs AFU 235, 236, 237, 245, 246, 247. The exemplary model may also include a global AFU manager 163 that cross cuts the different downloadable ACUs 230, 240 to manage all AFUs on the deployable application 205. The ACU manager 161 interacts with application interface 124 to display the appropriate ACU and AFU on the user device.

The Application Container Unit (ACU) 230 can exhibit a series of screens and templates of which can be actionable for sub-application or features, aka Application "Feature" Unit (AFU). Some features may be statically defined and not configurable, where other may also include a subset of screen maps and templates that can be configurable. This configurability is customizable on the backend servers to allow modifications to standardized workflows. If no configurability is available on the server, then no configurability will exist on the mobile.

Figure 4:
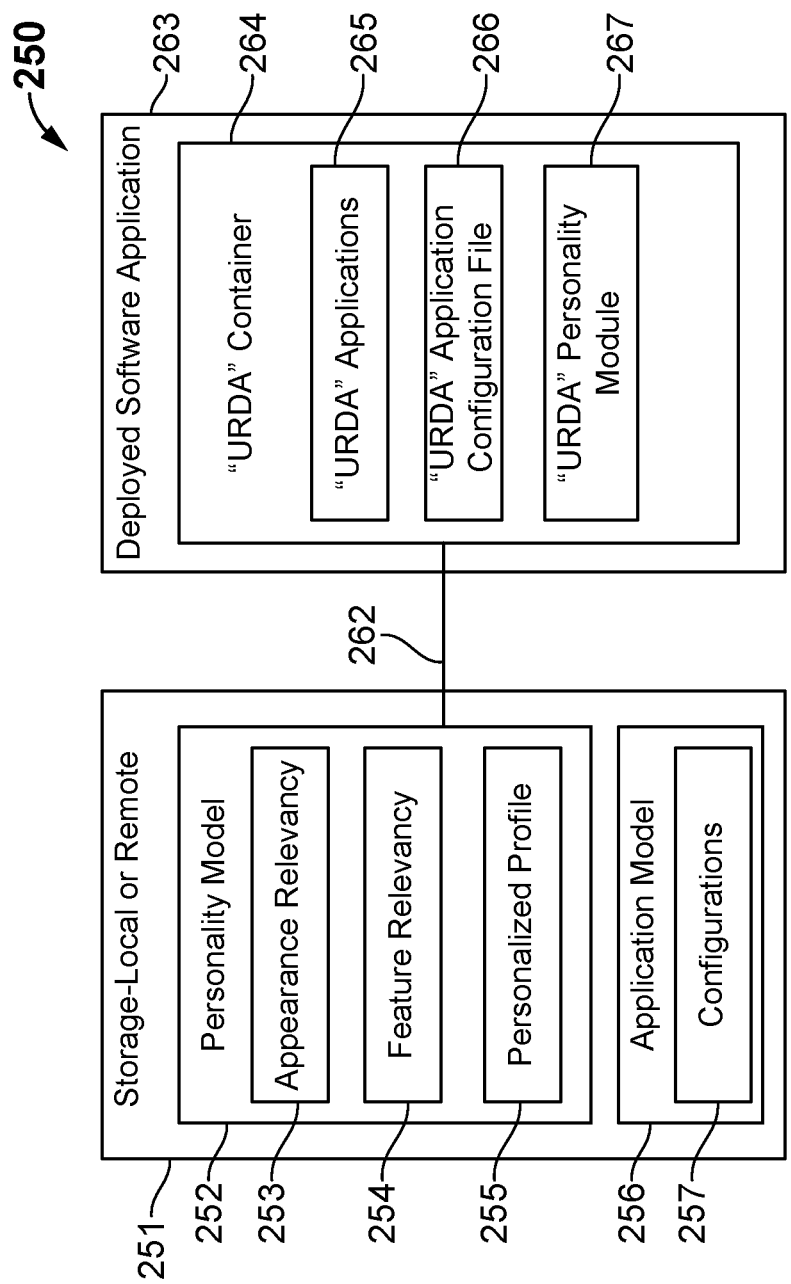
FIG. 4 depicts high-level system diagram of an illustrative embodiment of the present invention.

As seen in FIG. 4, the present invention provides a system 250 which includes a server or cloud-based system 251 with local and remote storage capabilities. The server storage system 251 builds a personality model 252 for each recipient based on the appearance relevancy 253, feature relevancy 254, and the recipient's personalized profile 255 related to application model 256. The system 250 analyzes the application model 256 as a function of configurations 257 that has been provided to the system 250. The system 250 also includes one or more client devices 263 running one or more software applications. The client device 263 communicates with the server through one or more communication paths or links 262. The software application 263 works with the server-based system 250 to build and present URDA containers 264 based on the URDA application 265, URDA application configuration file 266, and URDA personality module 267.

Through use of a myriad of known and captured data, training, varying real-world sensors, recipient interaction, and personality data and analysis, the system determines relevancy, continuously adjusts, and builds a real-time user or personality profile of the recipient or recipient of dynamic architecture endpoints. The real-time personality profile is then used to select, adjust, or build the style and wording of the content and presentation or graphical user interface of the content to the recipient.

The flexibility of the system allows ACU 130 and AFU 135 elements displayed to adapt automatically dependent on the calibration process. The calibration process can include both explicitly defined business rules and/or AI learning algorithms. If the application data input shows the user has shaky hands the AFU 135 may implement larger buttons. If the user has cognitive impairment the display may adapt to a lower reading level content or the AFU 135 may remove textual elements and display a larger image in a different position. If the user is a visual learner, the AFU 135 may adapt by swapping a base image with a diagram. If the user has a personality that likes hard challenges, the AFU 135 may change the question to a harder one. If the user's personality responds better to comfort, the shapes of the buttons will adapt to become more rounded. If the user personality responds to certain colors, the AFU 135 may implement the color style accordingly. If the user is color blind, the AFU 135 may adapt the color style accordingly.

Network

Figure 5:
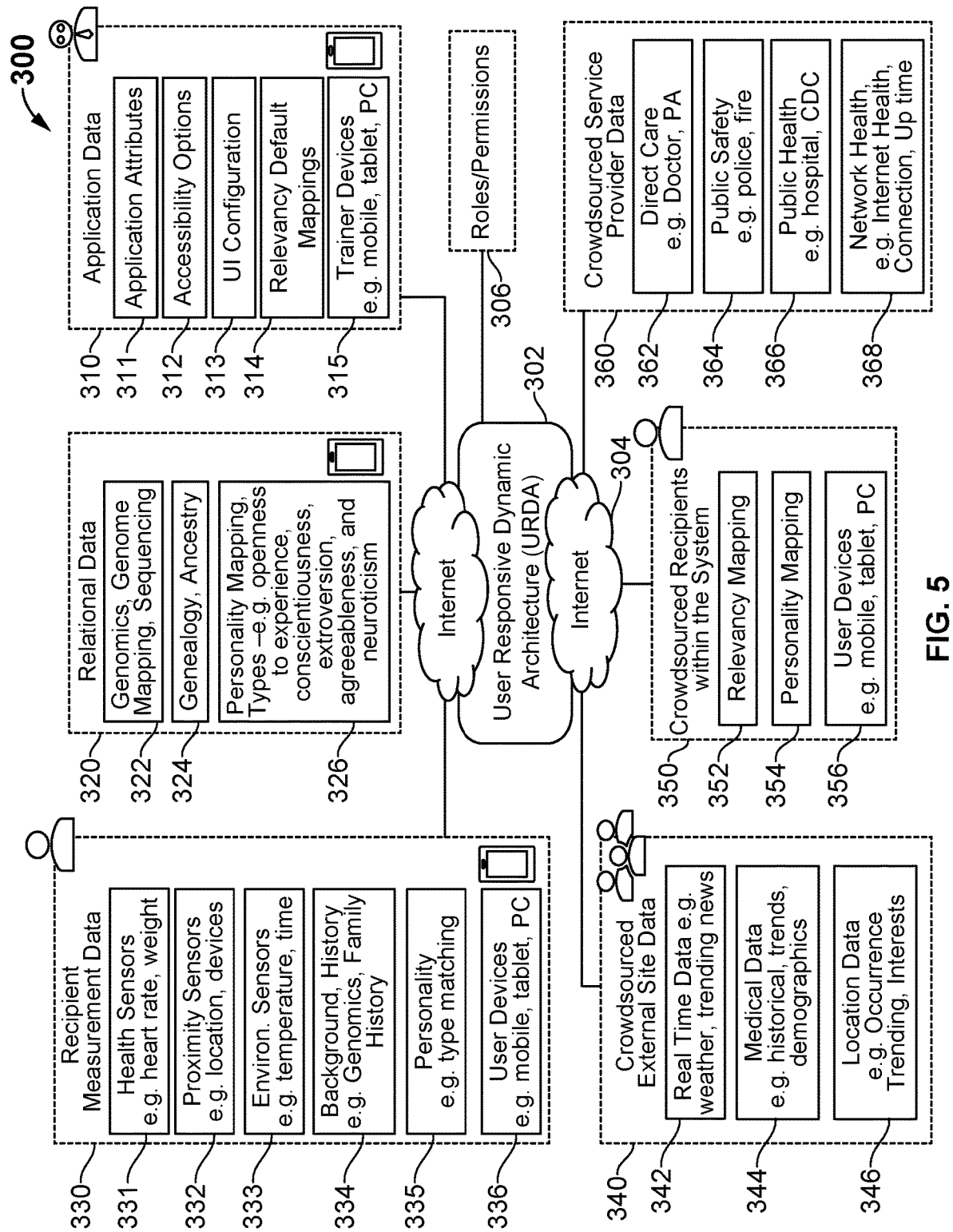
FIG. 5 depicts a more detailed system diagram of an illustrative embodiment of the present invention.

As shown in FIG. 5, the System 300 utilizes significant amounts of data to adapt the dynamic architecture, e.g. adapting the application architecture using real time data. More specifically, dynamic refers to the ability of the present invention to change or alter the way the application functions, its interface, features, content, and flow by modifying the ACUs, AFUs, and workflow used by the application. The Network 300 of the present invention includes the User Responsive Dynamic Architecture 302 which is connected via internet 304 or other communication methods to numerous devices and data. These devices and data segments include application devices and data 310, relational devices and data 320, recipient measurement devices data 330, external crowdsourced data 340, internal or system crowdsourced recipient data 350, and crowdsourced service provider devices and data 360. The User Responsive Dynamic Architecture 302 is also accessible by one or more admins and users having roles and permissions as set forth in the systems roles and permissions sub-system 306.

Within the application data 310, therein includes application attributes 311, accessibility options 312, UI configuration 313, relevancy default mappings 314, and trainer devices 315, such as mobile devices, and tablets.

The relational data 320 includes genomics, genome mapping and gene sequencing data 322, genealogy (genes, carrier, traits, risks) and ancestry data 324, and personality mapping data 326. Personality mapping data 326 may include data on personality types, such as whether a recipient is open to experiences, consciousness, extroversion, agreeableness, neuroticism, and other known types.

The recipient measurement section 330 includes health sensors 331, proximity sensors 332, environmental sensors 333, background data 334, personality data (type matching) 335, and recipient devices 336. Health sensors 331 might include things like heart rate and weight monitoring of data and would provide physiological data measurements. The proximity sensors 332 might include things like location sensors and devices with location tracking data and would provide activity related data measurements. The environmental sensor 333 would include sensors measuring temperature, time, passively sensed, ancillary, or other directly report data sources relevant to contextual cues and measured environment data. The background and recipient historical data 334 might include specific longitudinal history of the recipient, including genomics, and family history. The personality data 335 might include personality type matching information. Recipient devices 336 might include the types of devices such as mobile, tablet, pc, the operating systems within those devices, and how they are used and the device as a sensor.

The external crowdsourced section 340 might include real time data 342, medical data 344 and location data 346. The real time data 342 might include data such as weather or trending news, and would provide economic related data measurements. The medical data 344 might include historical data, trending data in terms of population (upward and downward risks, emerging, outbreaks, epidemic, and pandemic) and demographic data. The location data 346 might include occurrence data, trending data, and interests.

In addition, the system may include internal or system crowdsourced data 350 of recipients include relevancy mapping 352, personality mapping 354, and recipient devices 356.

Further, the crowdsourced service provider data 360 may include direct care 362, public safety 364, public health 366, and network health 368. The direct care 362 would include devices and data for direct care provides such as information that is de-identified by a recipient's doctor or physician's assistant. Public safety 364 would include devices and data such as police and fire or water and power through varying channels like public broadcast information. Public health 366 would include devices and data such as local hospitals, ambulatory and CDC information. The network health 368 would include devices and data based on internet connections, internet or provider health, uptime, and other similar network and communication-based information.

The network 300 includes interaction amongst application section 310, relational section 320, recipient measurement section 330, external crowdsourced section 340, internal crowdsourced recipient section 350, and crowdsourced service provider section 360 as used by the User Responsive Dynamic Architecture 302 to help formulate the ideal display for different users based on relevancy mapping 352, personality mapping 354 and other recipient-based elements to provide display of content relevant and related to the specific recipient.

Figure 6:
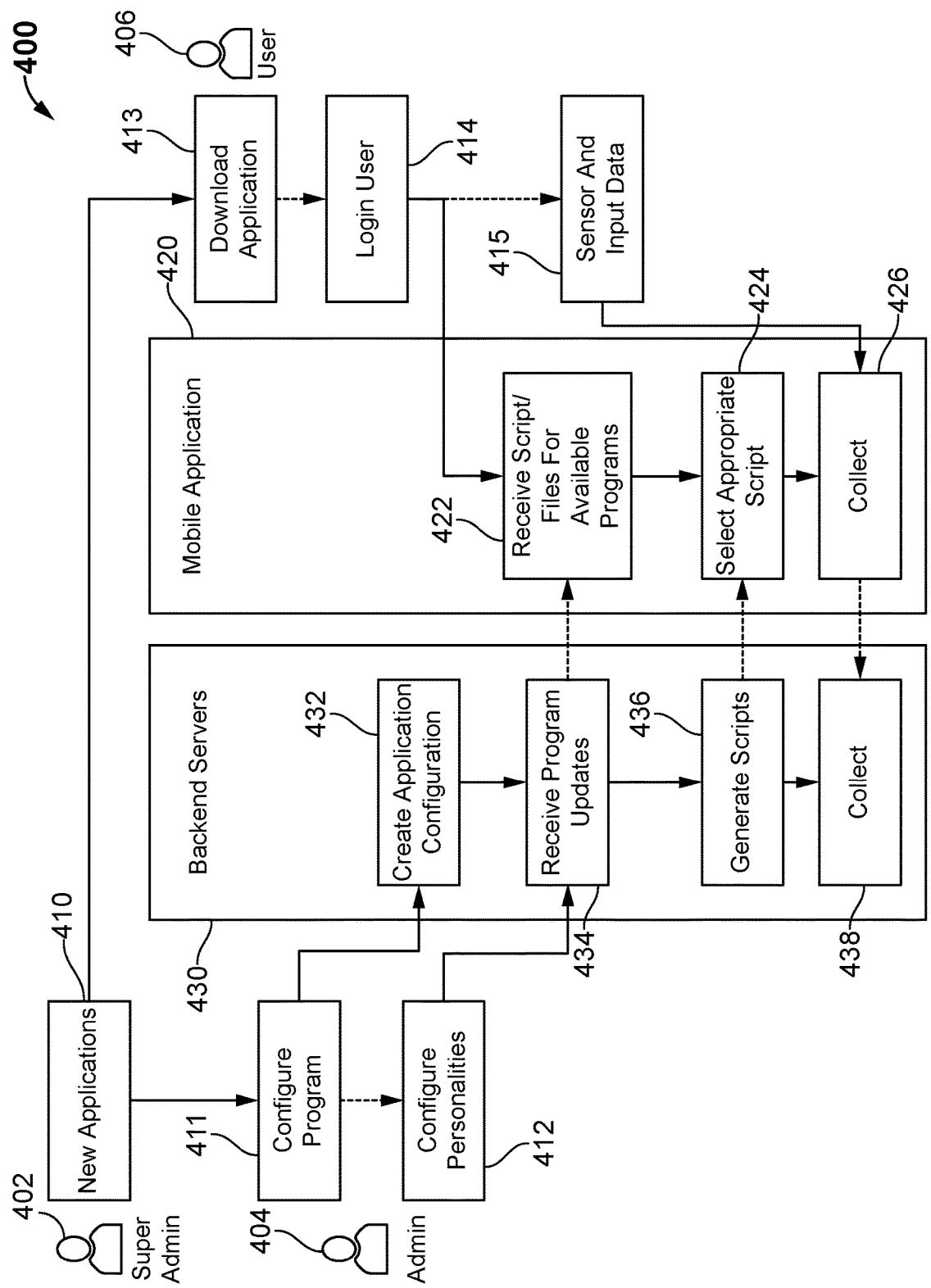
FIG. 6 depicts a flow diagram utilized by an illustrative embodiment employed by the present invention.

In FIG. 6 a super user 402 is permitted to deploy new applications 410 to the mobile application markets and the server. Once deployed any permitted admin 404 can modify the installation server to configure program 411 to match with the expected program and configure personality 412 to match with personality's responsiveness to a given program. The admin 404 configured program 411 creates an application configuration 432 on the backend servers 430. The created application configuration 432 and the configure personalities 412 receive program updates 434 in the backend servers. The program updates generate scripts 436 and will collect data 438.

When a user 406 of the system downloads the application 413 or updates, they may login 415 to the system (alternatively, this login can be bypassed with out of bands security, where the security could be confirmed based on the uniqueness of the device utilized with the application like a unique device identifier for the hardware.) The user 406 then receives a one-time update with script/files available programs 422 to the full configuration and templates available from the backend server 430 program updates 434. The mobile application 420 is updated with the configuration file that describes the sequencing and personalized layout to the individual and selects the appropriate script 424 from the generated scripts 436 for the user and collects data 426. Additional updates are provided as needed or if the system becomes corrupted. After the user logs in 414 the sensor and input data 415 are collected 426 and used to personalize the application.

Figure 7:
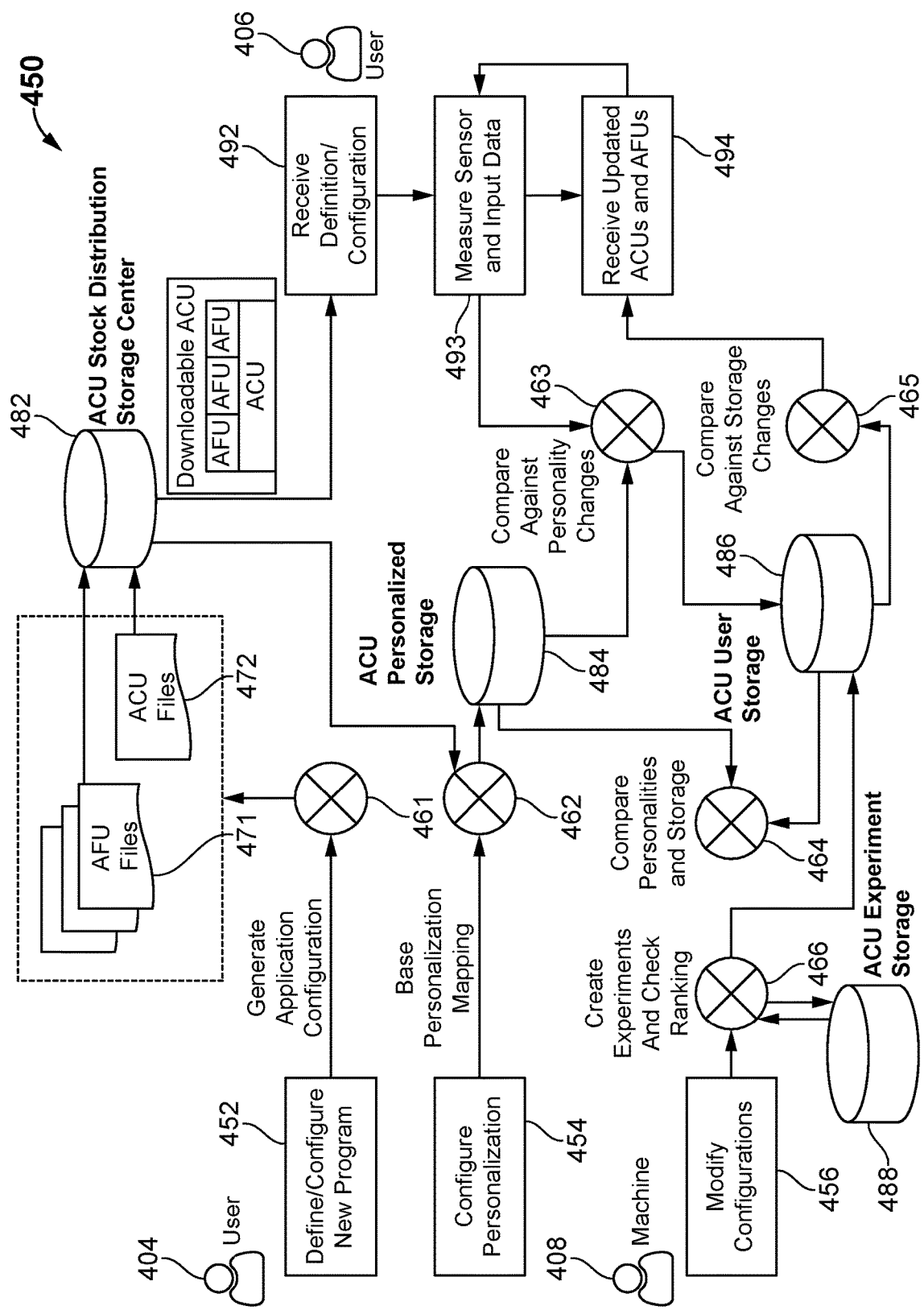
FIG. 7 depicts an additional flow diagram of how the ACU and AFU are modified and retrieved from the remote server of the present invention.

FIG. 7 depicts the flow of the system 450 when modifying, storing, and retrieving ACU 472 and AFU 471 configurations from the remote server and updating the ACUs 472 and AFUs 471 on the user device. The admin 404 defines/configures new programs 452 and configures personalization 454. The configured new program 452 generates application configuration in step 461 and are used to create AFU files 471 and ACU file 472. The AFU 471 and ACU 472 along with base personalization mapping 462 are transferred to ACU storage stock distribution storage center 482, which is downloaded by the user 406. Once the user device receives the downloaded definition or configuration 492 the application reviews the measure sensor and input data 493 and then, based on that data, receives updated ACUs and AFUs 494 based on measure sensor and input data 493. The measure sensor and input data 493 is compared against personality changes in 463 and the information is transferred to ACU user storage 486. ACU user storage is compared against storage changes 465 and this updates the ACUs and AFUs 494. The ACU user storage also compares personalities and storage 464 with the ACU personalized storage 484. The ACU personalized storage 484 is updated in part by the configured personalization 454 done by the admin 404 and uses base personalization mapping 462.

Machine Learning

The machine 408 is programmed to modify configurations 456 and create experiments and check ranking 466 of different variables. The machine 408 may be considered a variable artificial intelligent machine adapting and learning environment that is attempting to test new experiments to correlate trends across multiple users and revise personality mapping to confirm best approaches for usability through a series of feedback loops on access and statistical convergences. These experiments are stored in ACU experiment storage 488, the experiments are compared to the newly created experiments to check which variables are significant. After the experiment is created and checked 466 the information is transferred to ACU user storage 486 and used to update ACUs and AFUs. The machine 408 can be an augmented intelligence that is able to control for one or two variables while altering others to determine what may improve user involvement and experience. The augmented intelligence looks at whether or not a user responds better when there is variation in how the information is presented, or what color it is presented in, and if the user responds better what is the best interval of variation for the particular user to ensure optimal interaction. The augmented intelligence will be programmed with a large list of variables and control variables and test others based on user interaction. This augmented intelligence as utility would adapt to changing artificial intelligent systems to manage more variables and comparative systems as the data lake yields new trends and classifiers to individual type as psychology is redefined based on physiological, environmental and genomic yields new findings. A specific example of the type of experiments the machine may run is for User A data in the application is normally displayed according to user preference, i.e. a specific color or layout. The machine learning will test whether modifications on how the data is presented have an effect and what different modifications do to increase user engagement. So if a user normally likes his information presented with a green background and the information is depicted in large text files the machine may note that the user stops interacting with the application after 4 different screens, and the computer may change the color on the screen to blue to grab the user attention, or switch to a pictorial depiction. The machine will study how often User A needs a change and what is the optimal change to ensure consistent and attentive engagement with the application.

The present invention also provides a system capable of learning a user's preferences, as well as conducting tests with individual users or users across the network. The system makes use of machine learning and artificial intelligent testing systems to provide user updates and ACU/AFU/ workflow changes. The system provides a computing device comprising at least one processor and one or more computer-readable storage devices for storing instructions. The instructions when executed by processor(s), cause the computing device to receive, modify, analyze/store, and revert changes back to original. Moreover, when the device receives, by the computing device and over a computer network, a set of instructions, the set of instructions including at least one application container unit, a plurality of application feature units, and a plurality of application workflow segments. The computing device defines the set of instructions to utilize a first ACU, a first set of AFUs from a plurality of AFUs, and a first workflow set from a plurality of workflow segments. Further, the system allows the conducting of a test by modifying the set of instructions (client device or ACU/AFU/workflow) of the computing device to use a second ACU, a second set of AFUs, or a second workflow set. The system then analyzes and stores the user's usage data from the test; and then can reverting the set of instructions to use the first ACU, first set of AFUs, or first workflow set from the plurality of workflow segments. Additionally, the system can update the ACU, AFUs, or workflow segments to those revealed by the test to be optimal or preferred.

Workflow/Interface

Figure 8:
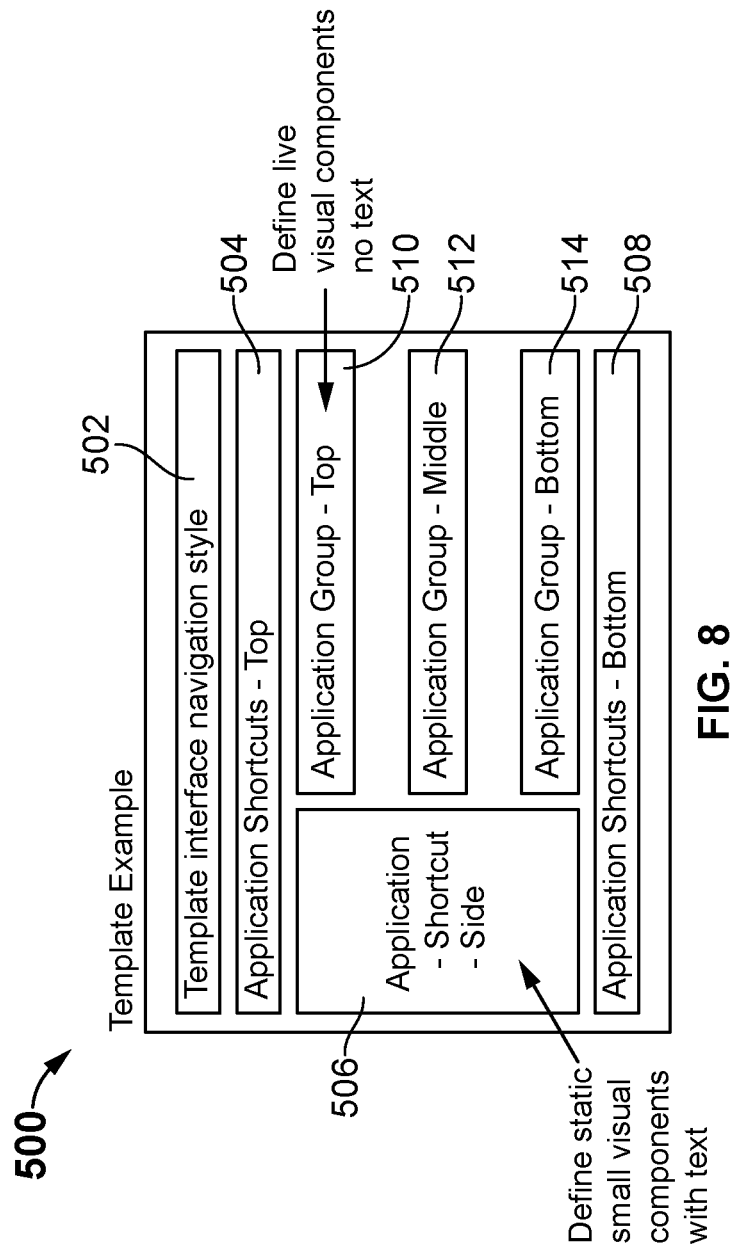
FIG. 8 depicts a custom template of an illustrative embodiment of the present invention.

FIG. 8 depicts a custom template 500 of the display the ACU manager will populate with ACUs and AFUs. A template defines the construct in terms of associated and inherited rules/requirements for the display, templates can be defined as unique to a screen or across as many screens as desired by the admin or permissible user. The custom template 500 example has a template interface navigation style 502 that dictates how everything is laid out on the display screen. Displayed on the screen are applications shortcuts and application groups. The application shortcuts are located at the top 504, the side 506 and the bottom 508. The side application shortcut 506 defines static small visual components with text. The application groups define live visual components with no text. Applications groups may be placed on top of display screen 510, in the middle of the screen 512 or at the bottom of the screen 514.

Figure 9:
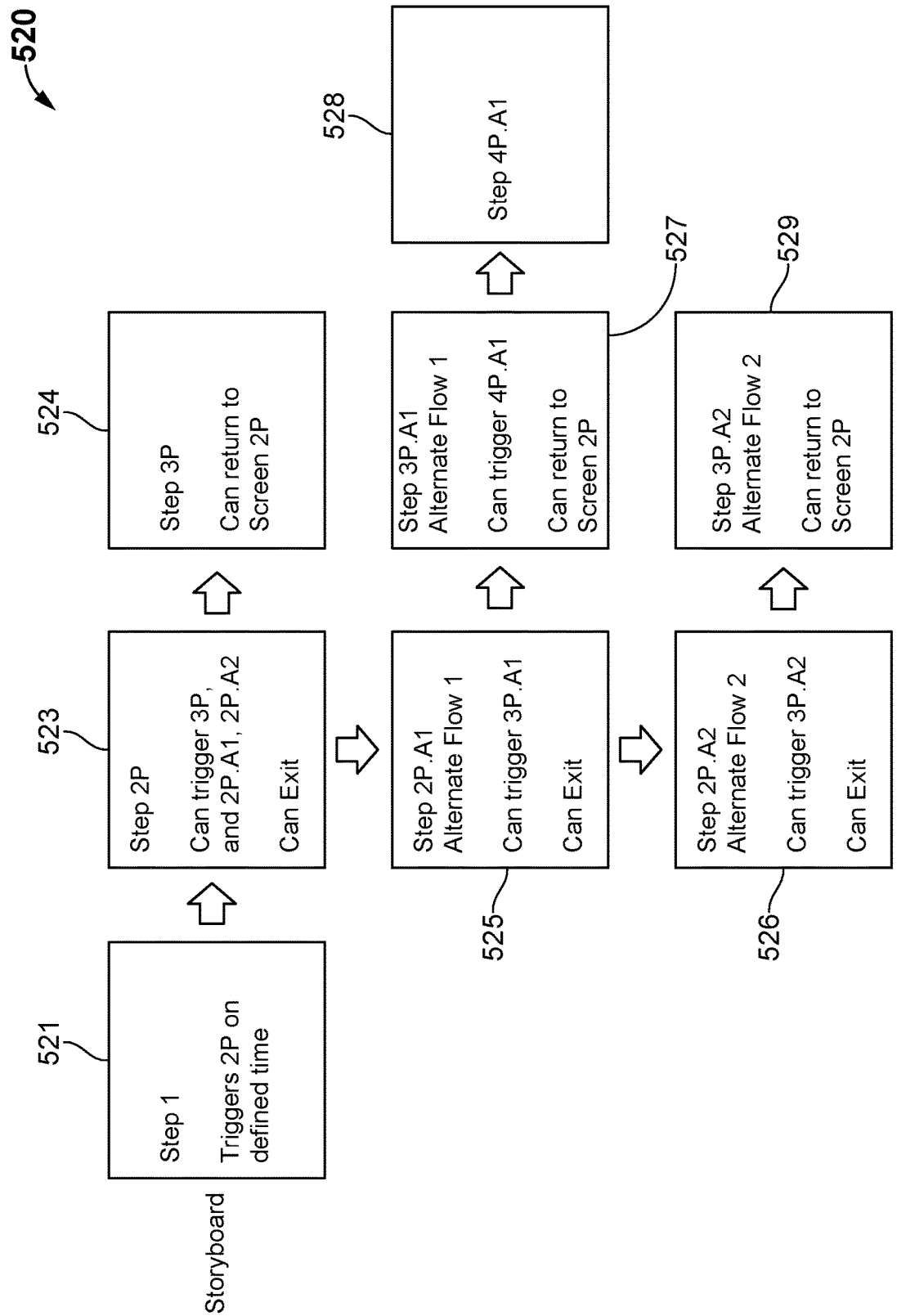
FIG. 9 depicts a custom flow of an illustrative embodiment of the present invention

FIG. 9 depicts a custom flow storyboard 520 of the present invention for ACUs and AFUs. A storyboard defines a connected set of actionable UI elements that a permissible user can explore. The storyboard 520 shows the decision-making process done by the ACUs manager to determine AFU or ACU to display based on the user. The storyboard 520 starts with path 1 521 which triggers a screen showing path 2P 523 at a defined time. Path 2P 523 will trigger a screen showing path 3P 524 and path 2P.A1 525 and path 2P.A2 526 depending on user preferences, or will exit the flow. Path 3P 524 can return to the screen with path 2P 524. Path 2P.A1 525 and path 2P.A2 256 are alternate flows that can trigger pathways for the ACU manager to follow and determine the appropriate display. Path 2P.A1 525 can trigger the screen with path 3P.A1 527 or can exit the flow. Path 3P.A1 527 can trigger a screen with path 4P.A1 528 or it can return to path 2P. If the user chooses the alternative path screen 2P.A2 526 can trigger 3P.A2 529 or it can exit. Path 3P.A2 529 can return the user to screen 2P to start the storyboard flow over. The storyboard sequence can be modified and altered to change with the needs of the admin and the system detected needs of the permissible user.

Figure 10:
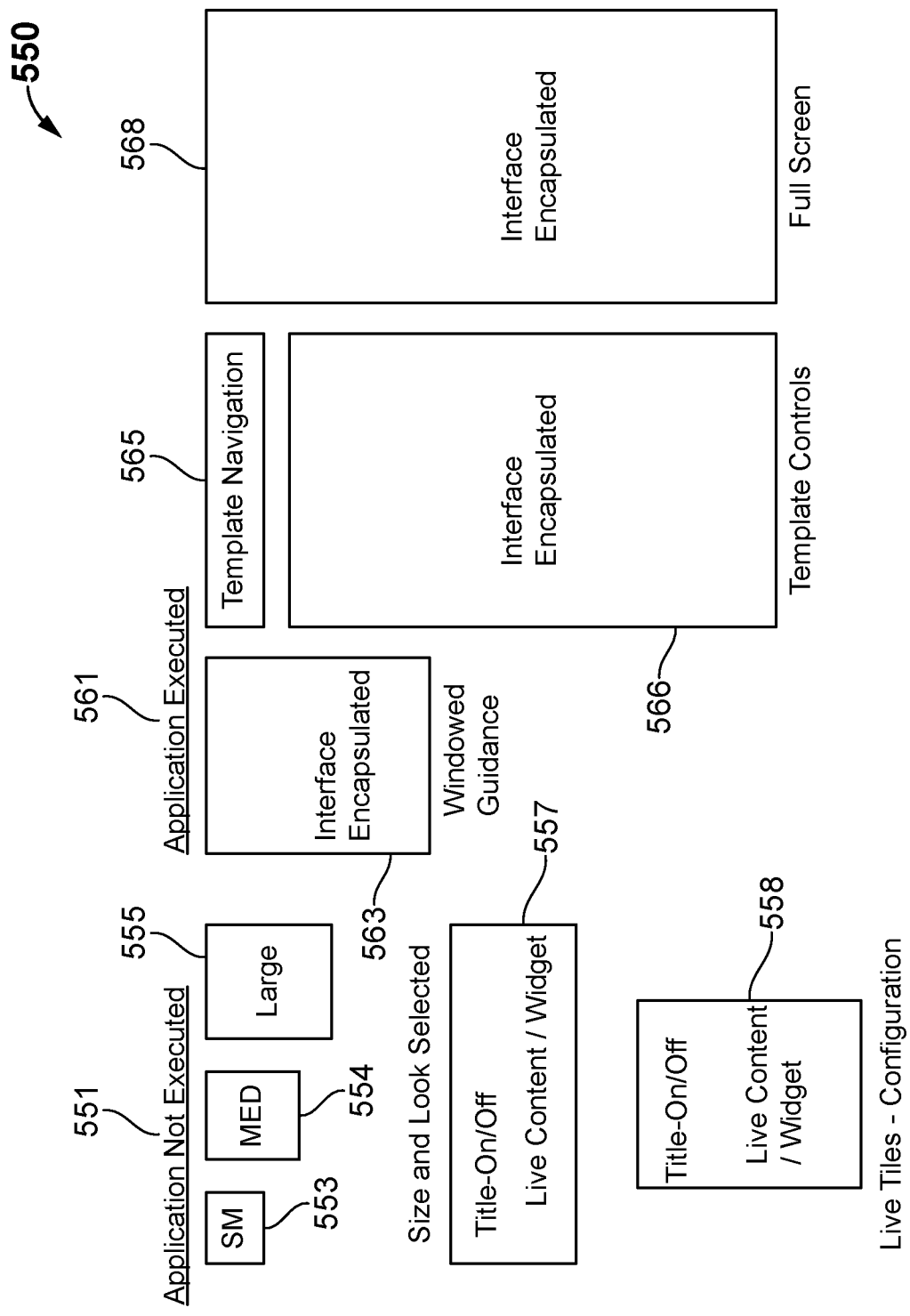
FIG. 10 depicts an application size and shape display of the present invention.

FIG. 10 depicts an application unit size and shape display example 550 of the present invention for ACUs and AFUs. Applications are actionable features that allow the permissible user to interact with components outline in an ACU and an AFU comprised of storyboards and templates. Applications can report information before it is interacted with and can vary in sizes and shapes. Application can be turned on or off on demand and can appear in any template in an unexecuted or executed state. In an unexecuted state, the individual does not navigate away from the existing screen or template. The individual can see the application as an image or a live feed with reports and can even navigate through the accessible reports as available by the application. An application not executed 551 can be displayed using varying size and shaped depending on the preferences of the user. The application visual component may be small 553, medium 554, or large 555 square. The display can be a rectangular visual component 557 or 558 that may display the title of the app and live content or a widget depending on the user's size preference. Once an application is executed 561 the application will allow injection of input data by the user and can be visualized in a windowed application 563, a full-size application 566 within the template navigation 565 provisioned, or as a full-screen application 568 that appear across the full screen of the container broadcasted to the user equipment.

Figure 11:
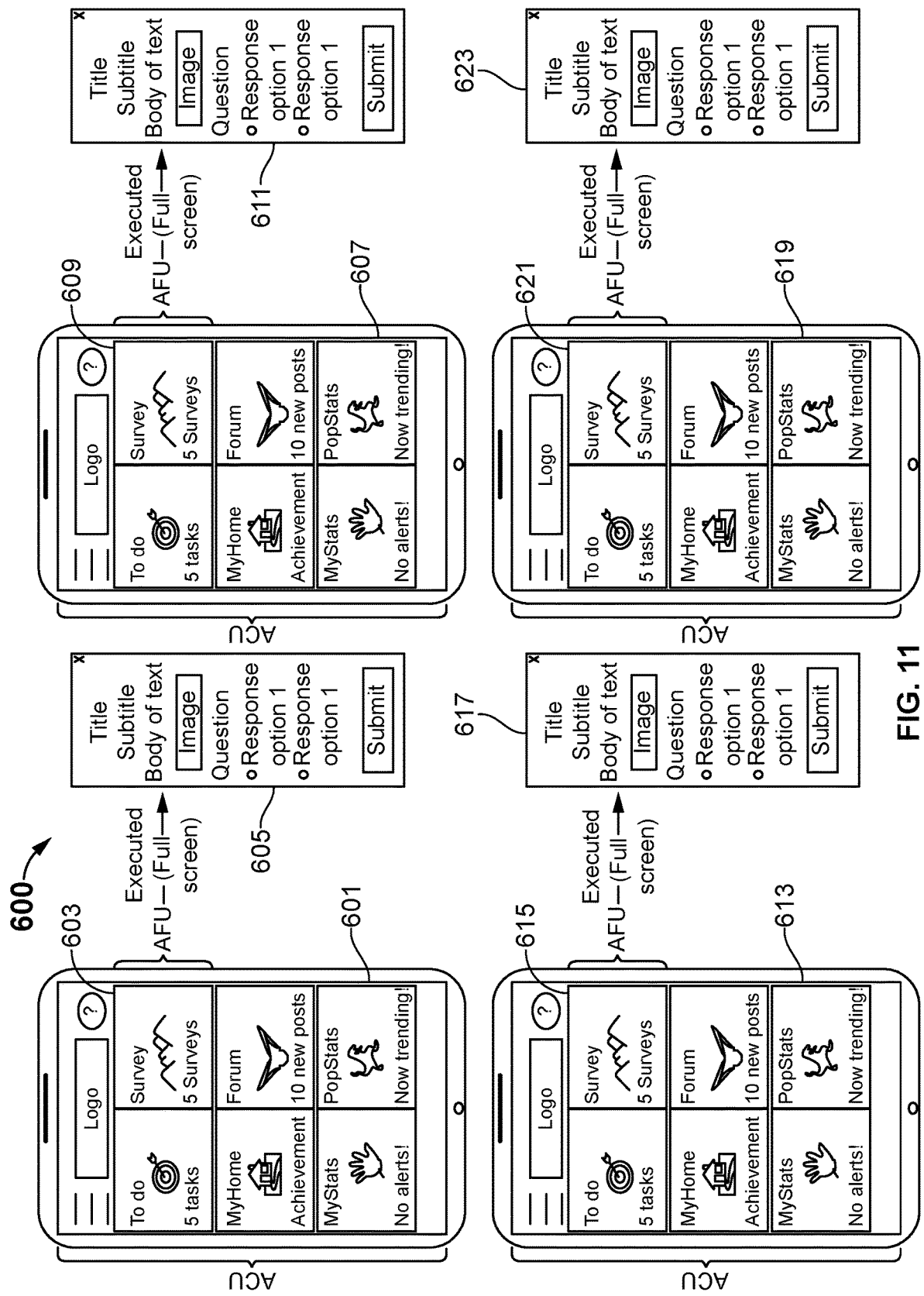
FIG. 11 depicts an unexecuted AFU within the ACU.

FIG. 11 depicts an unexecuted AFU within the ACU and variations of how it can be displayed in an unexecuted and executed manner. This UI template can be selected by an admin to prepare the content and to drive changes seen on the users existing downloaded ACU. ACU display 601 shows static AFU 603 in an unexecuted state and the executed full screen 605 that consist of a title, subtitle, body of text with an image and question with response options. ACU display 607 shows a interactive AFU 609 and the executed full screen 611.

Figure 12:
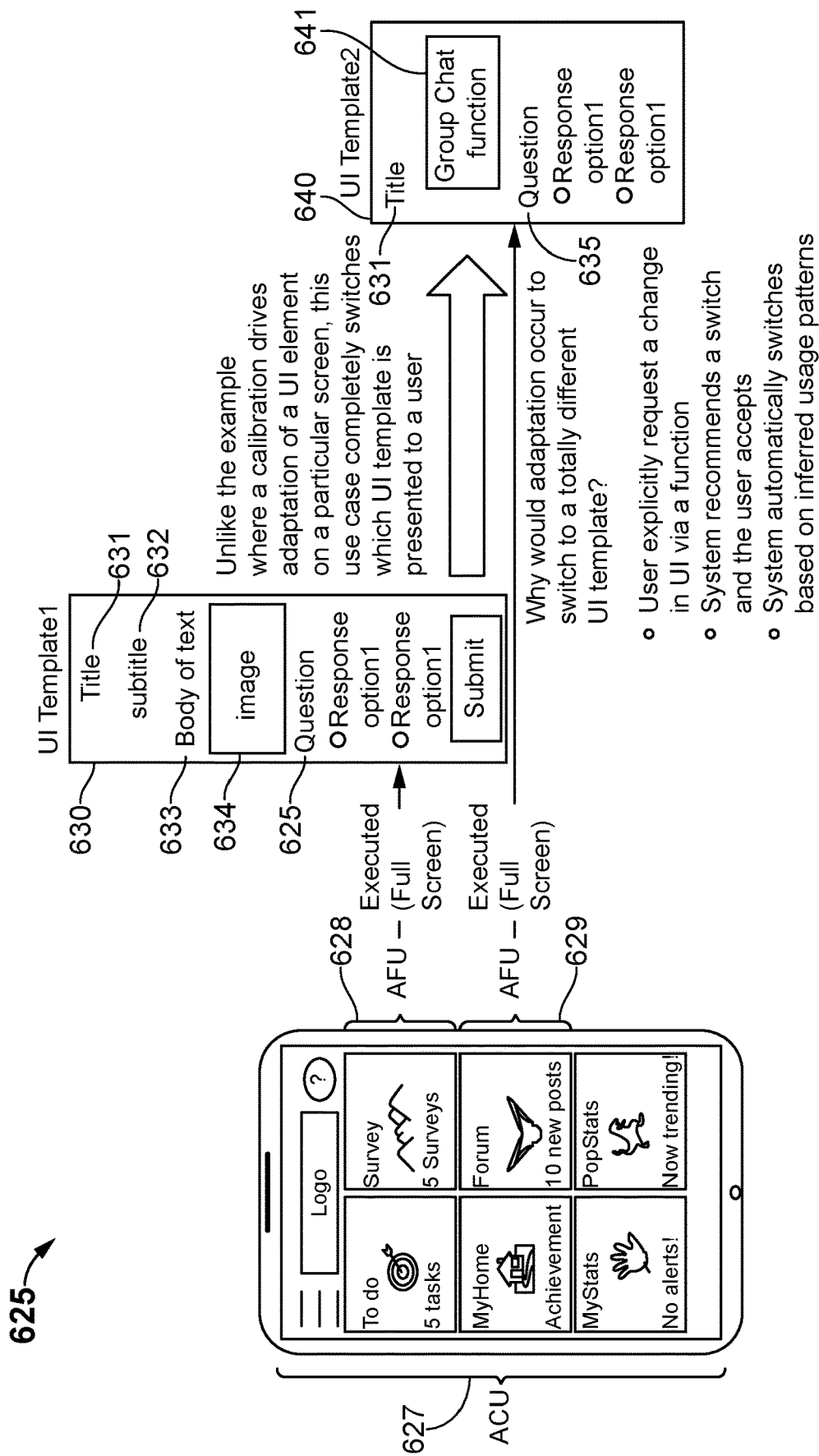
FIG. 12 depicts an evolving UI example.

FIG. 12 depicts an evolving UI example. In addition to uses cases that adapt specific UI elements on a screen, the invention also drives the entire UI template that is utilized for that particular user or set of users. This shift in template definition creates linkage to an AFU that can be selected from the ACU. Alternatively, this could happen within the AFU itself. The user interface displays ACU 627 on the screen. The ACU 627 has 6 different AFUs displayed. Depending on which AFU is selected the use case will switch which UI template is presented to the user. Thus, if AFU 628 is executed the UI will display UI template 630, which has a title 631, a subtitle 632, the body of text 633, an image 634, and a question and response section 635. If AFU 629 is selected the UI will execute UI template 640, which has a title 631, group chat function 642, and question and response section 635. The different UI templates displayed may be explicitly requested by the user, may be recommended by the system and the user accepts, or the system may automatically switch based on inferred usage patterns.

Figure 13:
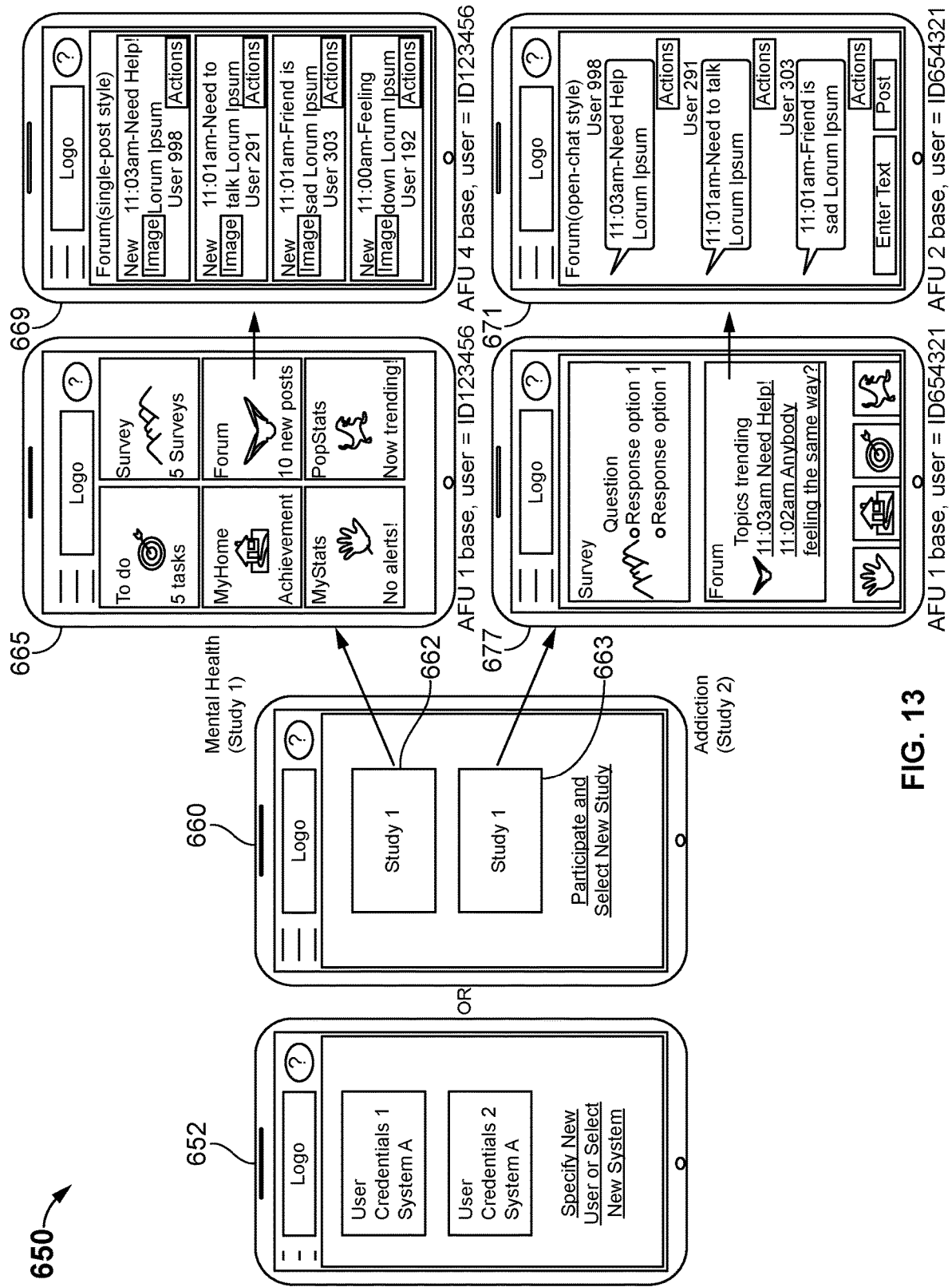
FIG. 13 depicts the ACU manager

FIG. 13 depicts an ACU manager 650, the ACU Manager 650 oversees when the user is presented with multiple services through the application. These services could be for unique or multiple user credentials and could be for the same or multiple systems, where systems define the cloud based connection point for the application. The ACU manager may specify new user or select new system as it is in UI template 652. The system could also support multiple studies, such as research studies in which the user has been given different credentials or a registration code which maps from the registration server to a unique program for the individual user. Once completing the registration process, the user is presented options for Study 1 662 and Study 2 663. UI template 660 allows the user to participate and select a study. The studies, while in the same application, are being managed uniquely by the server and provide a unique set of ACU and AFUs for the individual to interact with. For example, if Study 1 662 is a mental health study, then the individual/ participating user is shown the ACU 665 in a way that complies with the program, aka Study. The same goes for Study 2 663, which in this case is an addiction study the user would interact with differently than the study number 1 662. Each ACU 665 and 667 may utilize a base implementation defined by the system, but the configuration of the ACU and the features utilized may be customized to the program, in which case the AFUs may appear completely different upon selecting. And after selecting, they may appear in the executed state completely different as well, leveraging alternate base configurations with further customizations unique to that individual. ACU 665 in the executed state present AFU 669 and is forum single post style driven. ACU 667 in the executed state presents AFU 671 and is an open chat style design.

Storage Structure

Figure 14:
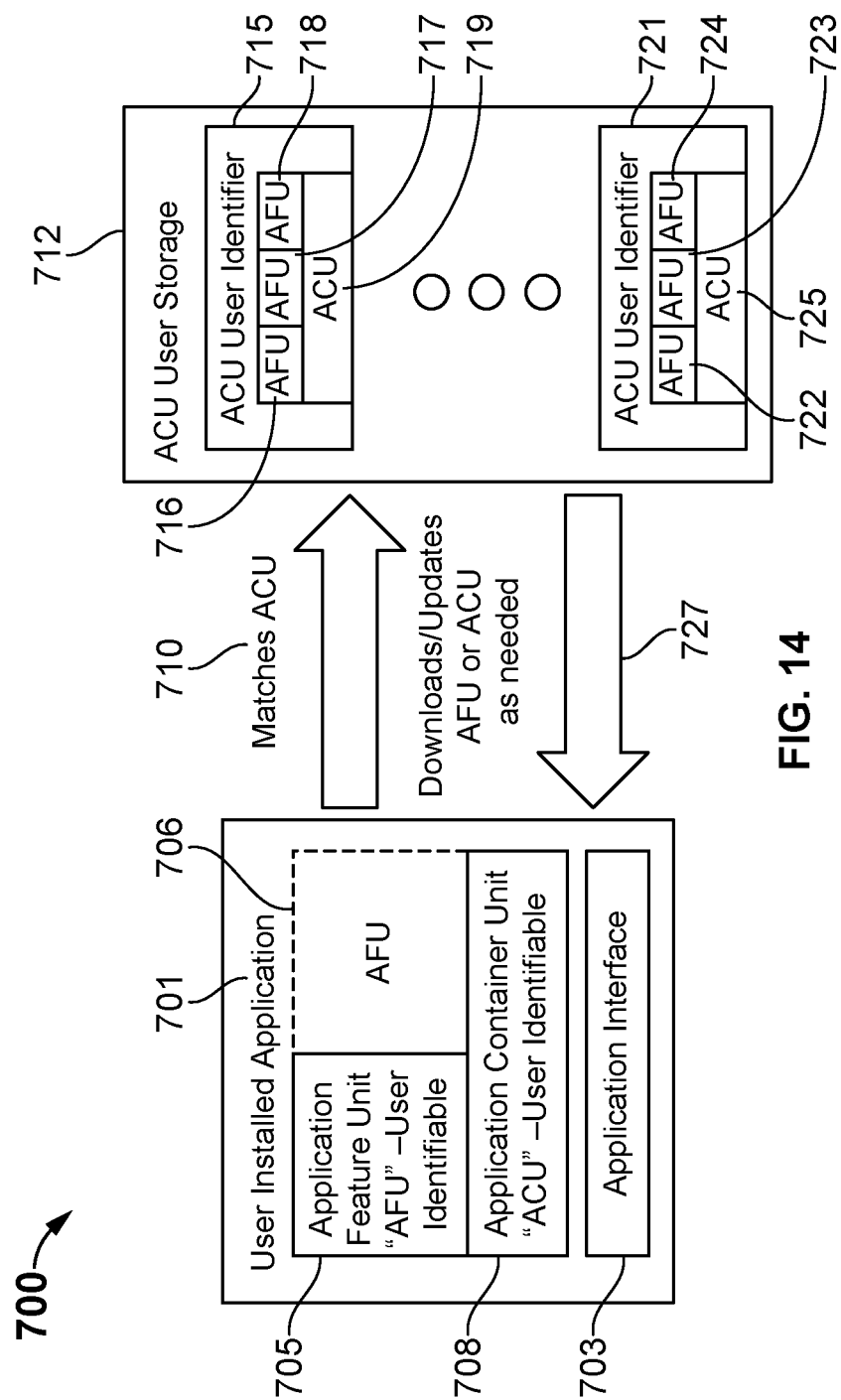
FIG. 14 depicts an ACU and AFU user storage.

FIG. 14 depicts ACU user storage structure 700. The ACUs are managed in part for each user by the ACU user storage. The user installed application 701 will match ACUs 710 to the ACU user storage 712 and download/update AFU or ACU as needed 727 with any changes specified from the ACU user storage 712. This storage can be both locally and remotely managed. The user installed application 701 contains an AFU-user identifiable 705 and 706 and an ACU-user identifiable 708, that are specific to each particular user. The user installed application 701 also contains an application interface 703 that controls display of the application on the device. The application matches ACUs 710 with the ACU user storage 712 and uses this information to update and download the AFUs and ACUs 727 on the user device as needed. The ACU user storage 712 contains ACU user identifiers 715 and 721. The ACU user identifiers 715 and 721 contain AFU 715, 716, 717, 722, 723, and 724 and an ACU manager 719 and 725.

Figure 15:
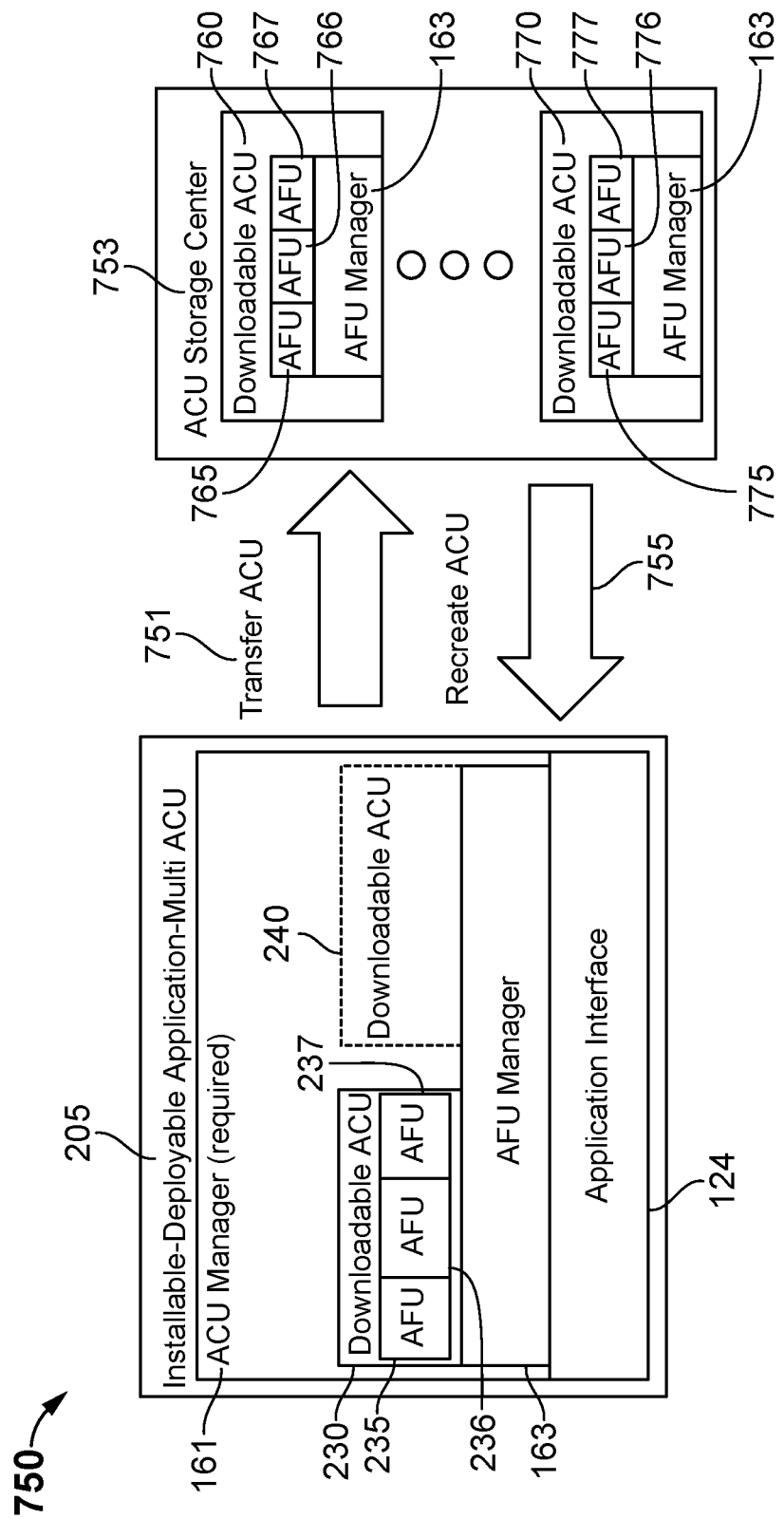
FIG. 15 depicts an ACU and AFU stock distribution storage center.

FIG. 15 depicts ACU stock distribution storage center 750. New ACUs are downloaded during initial application installation, or when the user specifies to the ACU Manager, or if the ACU manager requires for any reason, such as transferring a corrupted ACU for repair for example. This may appear as a stock distribution storage center or may be programmatic based on a sign-up code that identifies an ACU during registration. The installable-deployable application in operation with a multi-ACU 205 includes an ACU manager 161 overseeing one or multiple downloadable ACUs 230 and 240 and an application interface 124 to display the deployable application on the device. The downloadable ACU 230 and 240 have multiple AFUs 235, 236, and 237 and an ACU 165. The deployable application 205 may include a variable amount of downloadable ACUs depending on the applications functions. When the ACU Manager 161 determines an ACU needs to be repaired or evaluated by the ACU storage-stock distribution storage center 753, the ACU is transferred 751. The ACU storage-stock distribution storage center contains downloadable ACUs 760, 770 that are made up of ACU 769 and 779 and AFU 765, 766, 767, 775, 776, and 777. The downloadable ACU 760 and 770 are used to recreate the damaged ACU and transferred back 755 to the user device.

Updating Workflow Flowcharts

Figure 16:
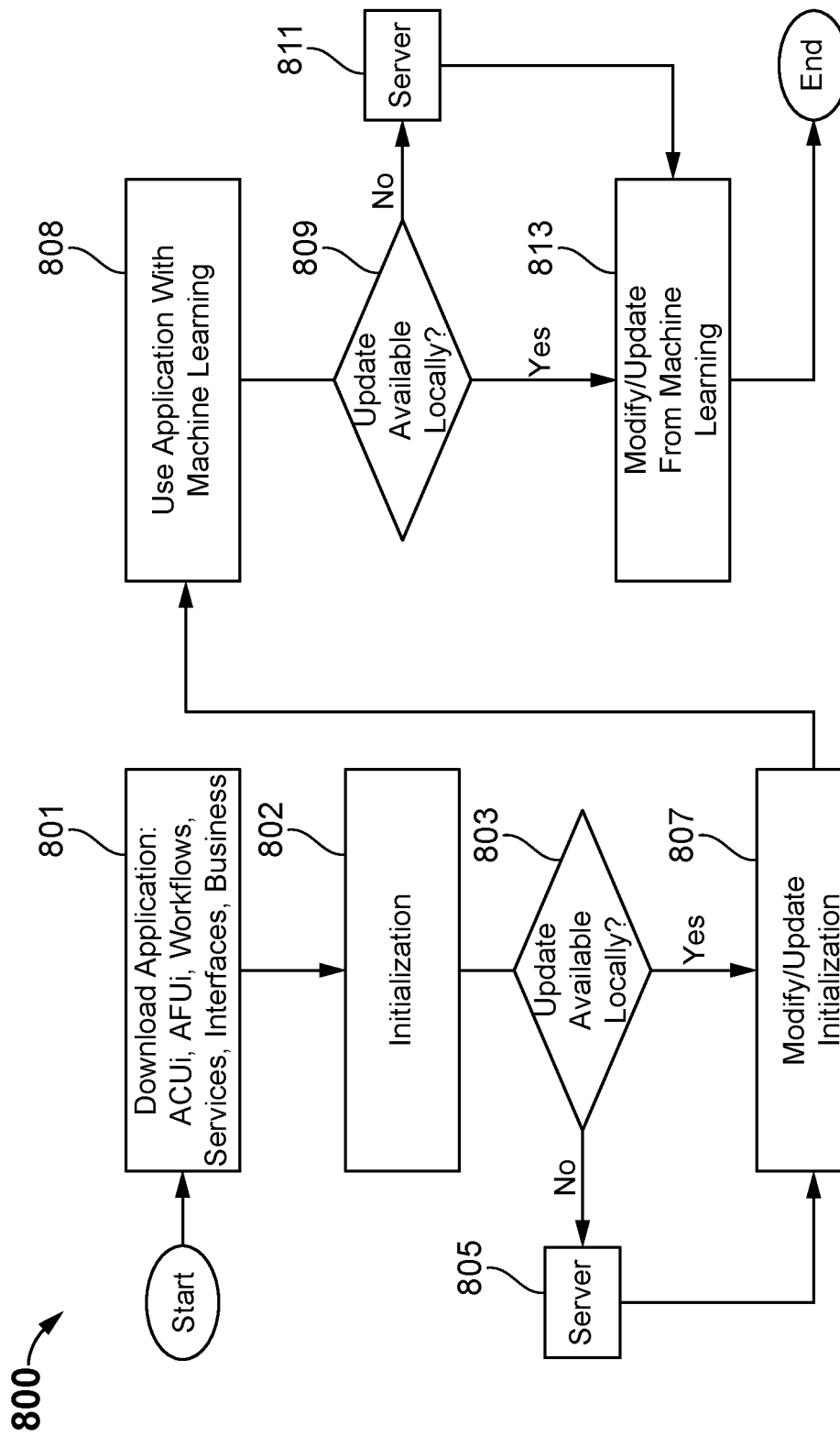
FIG. 16 depicts the flow process of the personalization of the ACU and AFU.

FIG. 16 depicts a basic flowchart of the personalization of the ACUs and AFUs 800. The application is downloaded with initial ACU, AFU, and variable service layers 801 (collectively referred to as B3). After the application is downloaded the initialization 802 process is activated, and the application may discover what is the user's dominant hand, what is the preferred color, what font size is best, etc. After initialization 802 the server or the base application will modify the B3 based on whether the update is available locally 803. The server will modify/update 805 B3 if the initial downloaded ACU, AFU and variable service layer do not have the program for further personalization. If the B3 do contain the information for further personalization, the initialization will be modified and updated 807 without consultation with the server. After the modification/update of the initialization the application use by user is observed with machine learning 808. If the B3 are in the initial application 809 the machine learning modifies and update the machine learning process 813 with application data, if the B3 are not in the initial app 809 the machine learning communicates with the server to modify and update 811 the process. As shown above the application is initially downloaded onto user device and during the registration process the personalization/initialization begins by either the user answering a list of questions or inputting an invite code relevant to the specific user. The application uses sensing data and registration data in order to choose appropriate ACU, AFU, and workflows from the server or the downloaded application. The AFU will influence how the information is displayed and the workflows give the optimal order for the application user, such as the optimal size of application display and type of text used. The different ACU, AFU, and workflows will be tested by the machine learning to ensure optimal user interactivity. The machine learning will store all results to further refine the process.

Figure 17:
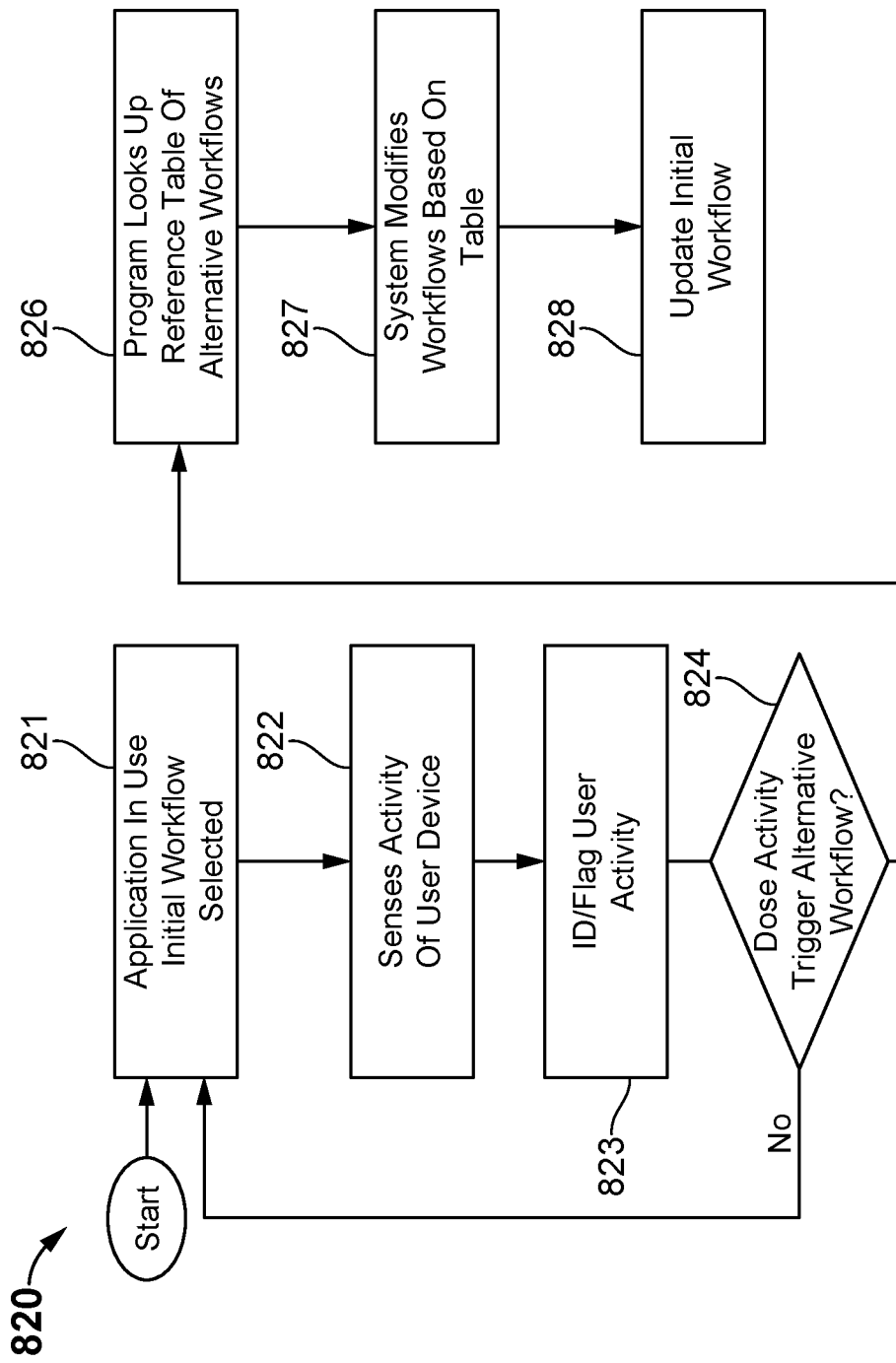
FIG. 17 depicts a flow chart of how the workflow is modified.

FIG. 17 depicts a flow chart of how the workflow is modified 820. The application is in use and an initial workflow is selected 821. As the application is used by the user the device is taking sensing data 822, i.e. whether the user is pounding on bottoms, listening to how active the area is around the user, etc. The device reads the sensing data and ID/flags user activity 823 and determines if the activity triggers an alternative workflow 824. If the activity does not trigger an alternative workflow the application will continue to use the initially selected workflow 821. If the system determines the activity triggers an alternative workflow the system looks up a reference table of alternative workflows 826 that correspond with flagged user activities. The system will modify the workflow based on template 827 and update the initial workflow 828. If the system does not find an appropriate template the system will create an alternative workflow and update the initial workflow with the new template.

Figure 18:
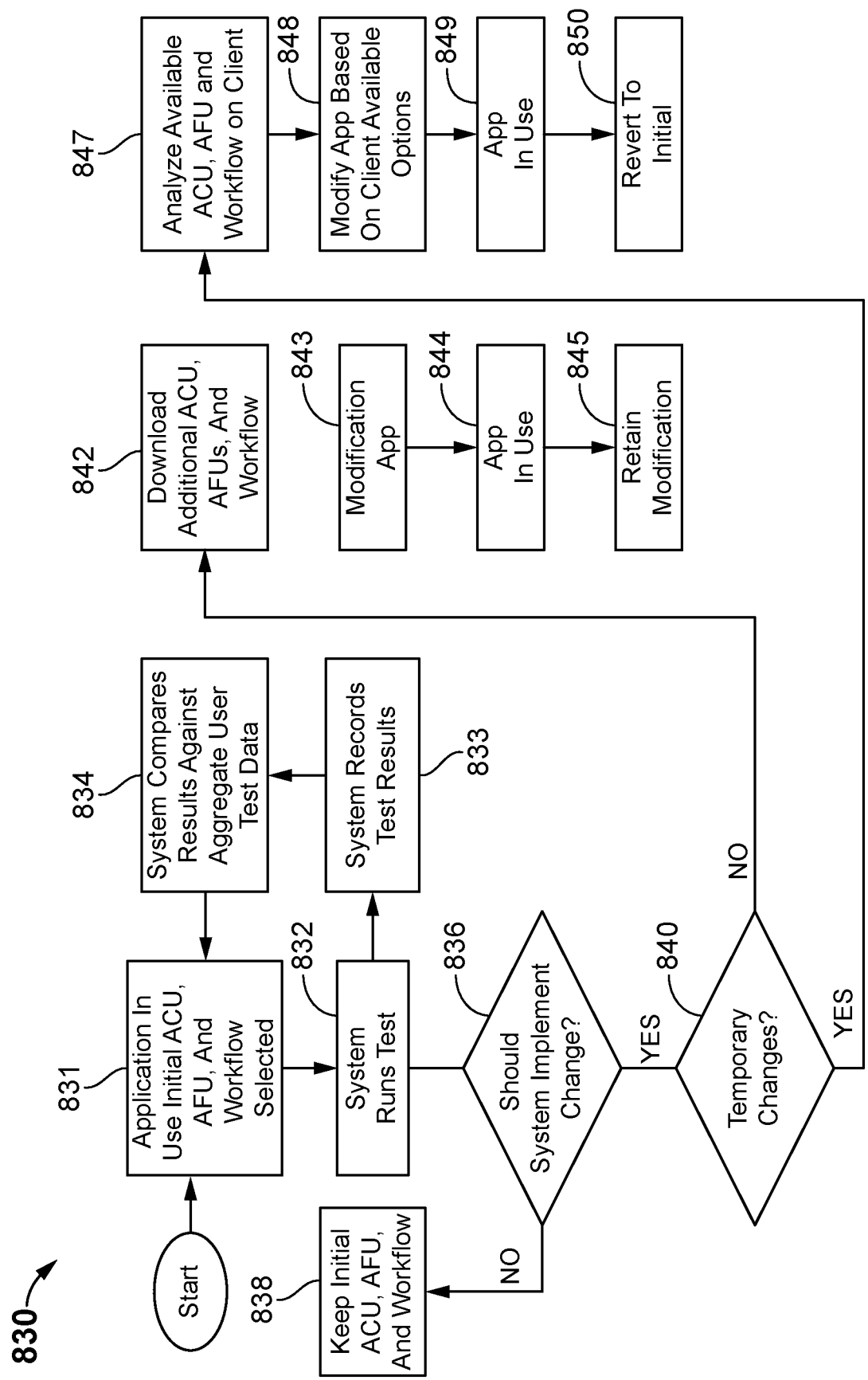
FIG. 18 depicts the process of modifying ACU, AFU and workflow on a user device.

FIG. 18 depicts the process of modifying ACU, AFU and workflow 830 on a user's device. The application is in use and an initial workflow is selected 831, the system runs test 832, records the results 833 and compares the results against aggregate data 834. If the system determines that improvements can be made to increase interaction with the application the system will implement either permanent or temporary changes to the ACU, AFU, and workflows. If the test results show that no changes would improve interaction it will keep the initial workflow 838. If changes are implemented they can either be temporary or permanent. If temporary changes are needed they application will analyze available ACU, AFU and workflow on client device 847. Based on the analysis the application will be modified based on available options 848 and the changes to the app will be in use 849 until it reverts to the initial ACU, AFU, and workflow selected 850. The modification of the application 848 is specifically the updating of the ACU and AFU reference tables. If the change is not temporary the application will download additional ACU, AFUs and workflows 842 and modify the application 843. The modifications will be used 844 and the application will retain the modifications

845. An example of a temporary change is the system may modify the AFU color while keeping the workflow consistent, the computer may run a test and find that the user responds best to one color, but in order to maintain active participation they need to see a change of screen in a set sequence.

The present invention also provides a system capable of updating an application to one with an updated application configuration consisting of a new ACU, new AFUs or new workflows by utilizing ACUs, AFUs, and workflow segments already resident on the device. The present invention provides a computing device comprising: at least one processors; and one or more computer-readable storage devices for storing instructions. Those instructions, when executed by the processors, cause the computing device to receive or capture user interaction data, analyze the usage data, and update the initial application configuration from a first ACU, AFU, or workflow to a second ACU, AFU, or workflow utilizing ACUs, AFUs, and workflow segments available on the device. Further, when the computing device receives, by the computing device and over a computer network, a first set of instructions stored on the computer-readable devices, the first set of instructions including an initial application configuration, at least one application container unit, a plurality of application feature units, and a plurality of application workflow segments; the initial application configuration identifying a first ACU, a first set of AFUs from the plurality of AFUs, and a first workflow set from the plurality of workflow segments for the computing device to use. The device captures user interaction data with the initial application configuration and analyzes the user interaction data with the initial application configuration. After analyzing the device, the system updates the initial application configuration based on the user interaction data to a second application configuration, which causes the set of instructions to use a second ACU, a second set of AFUs from the plurality of AFUs, or a second workflow set from the plurality of workflow segments.

Efficiency Improvements

Figure 19:
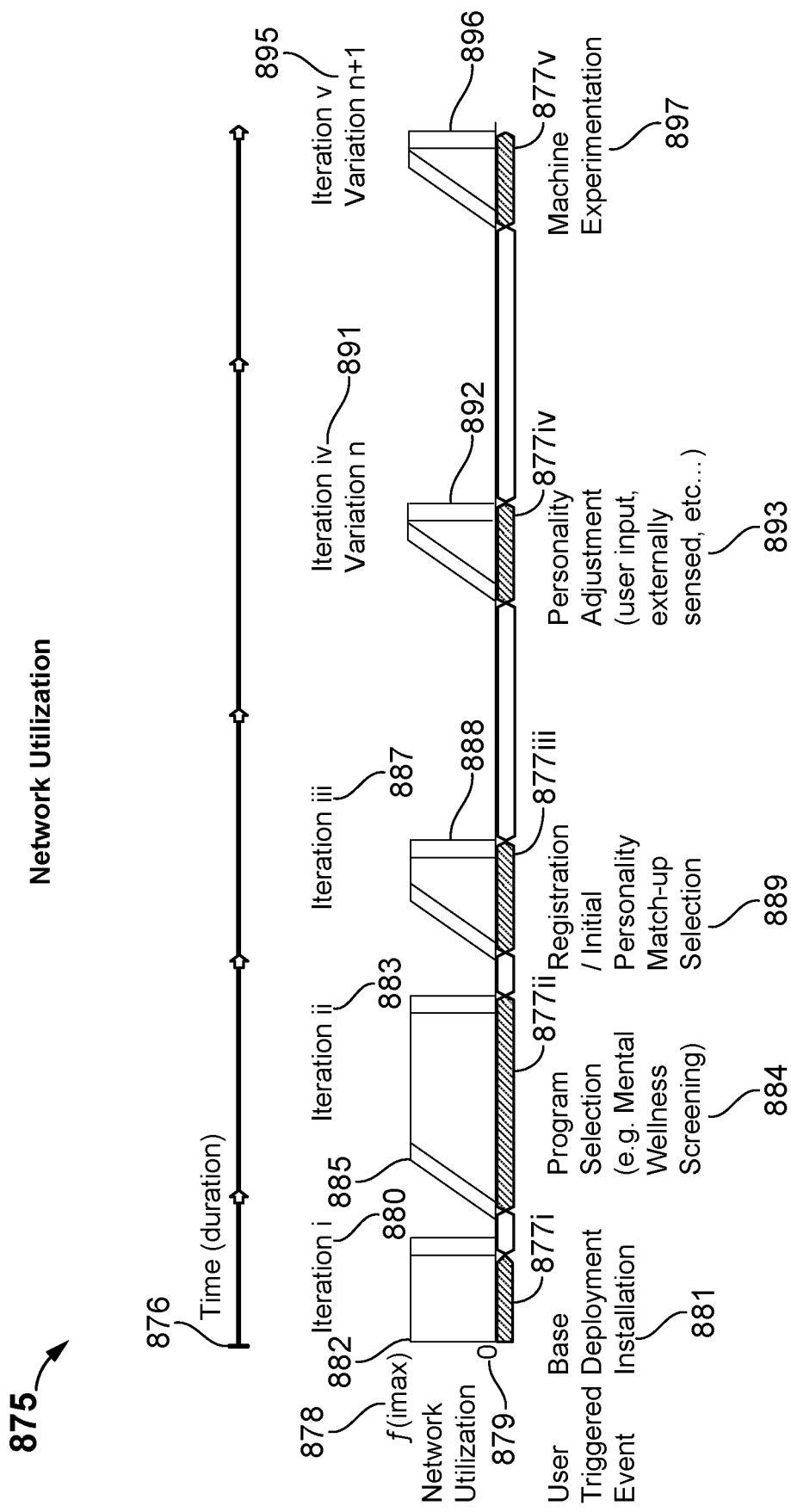
FIG. 19 depicts a breakdown of the download change/shift flow of the application over its life.

FIG. 19 depicts the improvement to network utilization 875 and updating of the application offered by the present invention from the current standard practice. The figure shows the network utilization of the application shown over time 876. The triggered events are the data being downloaded depicted by bars 877 (i, ii, iii, . . . n+1). Presently users download the base deployment installation 881 of the application (iteration i 880) to their device. The user then goes through the first stage of program selection 884 (iteration ii 883), where the specific program may be selected by the user. Upon selection of the program an initial configuration is determined based upon the program, which may not be personalized if the user is new or unknown. For example, the application would be configured upon program selection 884, top provide the selected program (e.g. mental wellness screening). The program selection information received by the servers will then determine the code to provide in the $2^{nd}$ deployment (iteration ii 883 and 877*ii*). Initially, the information received by the user, or on the user device, will use broad categorizations to determine relevant information, initial ACU, AFUs, and workflows provided to the user. If there are subsequent updates to the application, the system can update the program as a whole or can update only selected parts or elements (i.e. ACUs, AFUs, workflow segments).

Current applications or current systems provide only basic personalization (i.e. choosing a specific standard preset categorization), if personalization is offered at all. In contrast, the present invention allows significant and iterative personalization beyond mere preset categorizations. During iteration iii 887 the user undergoes subsequent registration and initialization where an initial personality is matched 889. Once the system determined the initial personality profile, the system deploys an update 877*iii* to the user's device. Through user input, sensed data and usage data of the application, the system can determine appropriate personality adjustments 893. Once those adjustments are determined, the system can deploy 877*iv* updated code which results in iteration iv 891 of the application on the device. The system can continue to track user input, usage data, and sensed data and make additional personality adjustments and additional iterations deployed to the application. Additionally, the system can conduct machine experimentation 897 for that specific user or for groups of users to determine potential enhancements or alternative ACUs, AFUs, and workflows as deployed to the device in iteration v 895.

The amount of time 876 to download or deploy application updated impacts the overall efficiency of the network and network utilization. The present invention improves network utilization by minimizing the amount of time and the amount of updates or information needed to be downloaded or deployed on the user's device each time the application is improved/updated. The base deployment 881 is typically of a limited size from a data perspective that is independent of the network utilization. Often, the size of the base deployment 881 may be limited by a $3^{rd}$ party network (i.e. Apple's App Store) to minimize the initial deployment while the user is on the $3^{rd}$ party's network. The network utilization 878 is a function of the iteration and the bandwidth available described as f(imax) over time required for the transactional needs between the client and the server(s), as depicted for the various iterations, runs from an initial 0 time and bandwidth denoted by 879 and is depicted utilizing a network with a variable bandwidth increasing up to f(imax). The time and efficiency of each deployment and the network efficiency is dependent on the ideal network connectivity and processing availability of systems offered by the system's network. In the exemplary network, i.e. higher bandwidth, each deployment or iteration is downloaded in less time than a standard deployment or update of current applications deployed on user devices. The base deployment installation 881 may be of a limited download size because the application may be available through a $3^{rd}$ party application storefront which employs maximum initial application data or file size requirements. The download rate, depicted as the line height 882 from the download bar 877*i*, for each iteration in FIG. 19 is depicted as being relatively constant to highlight or the network or deployment efficiency in later iterations (887, 891, 895). The download times, represented by the slanted line 885 and the termination lines 888, 892, 896 determine the total deployment of the install or update based on bandwidth f(imax) for each iteration which are also depicted by deployment bars 877 (i, ii, iii, iv, v). A longer the deployment bar 877 is indicative of an installation or update with more code or data to deploy and install. A problem with current or existing applications, which need updates, is that it typically requires the application provider to update the entire application or to update large segments of the application. Such large updates are customary because the applications, if segmented, are segmented in large sections because the application as a whole (or the code of the application) is not structured or architected in a way that segments the application's containers, features, and workflows. However, the present invention provides an improved and novel architecture which segments the application or code into logical modules related to the application's container, features, and workflows. These modules may also be referred to as code elements, code particles, or code units. Therefore, the installation and updates, are smaller because only those code modules or elements which need to be added or updated need to be deployed. Thus, as evident in FIG. 19, subsequent iterations (887, 891, 895) have a decreased amount of download and installation time necessary due to the selective and segmented downloads of only those modules or code elements which need to be updated or added.

Figure 20:
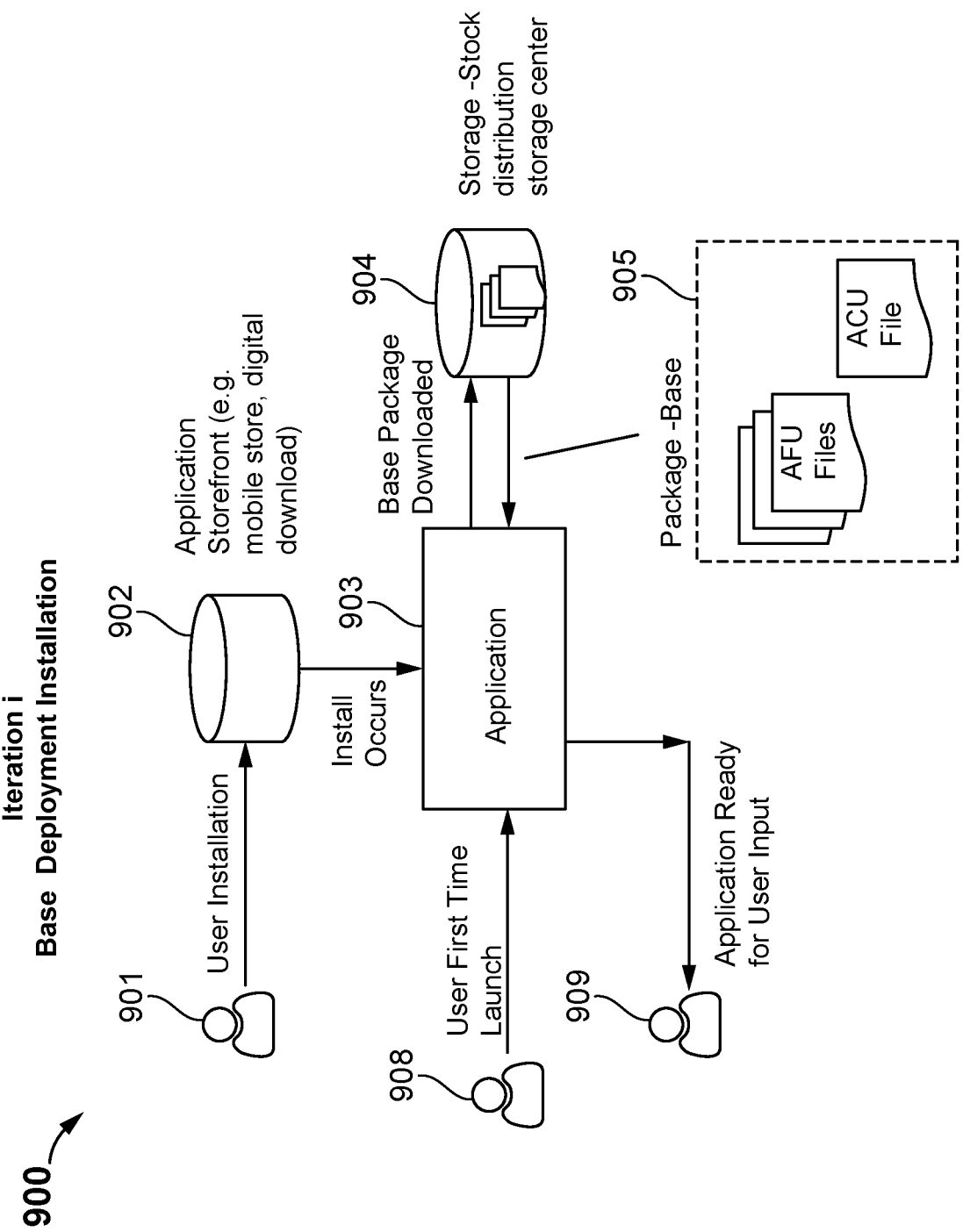
FIG. 20 depicts a base deployment installation.

FIG. 20 depicts the current process of a base deployment installation, iteration i 900. The user 901 goes to the application storefront 902, such as a mobile store or digital download, and installs the application 903 and gets the basic interface for the user. The application is installed 903 and when the user launches the application for the first time 908 the base package is downloaded 905 from the stock distribution storage center 904. The base application 905 contains the actual AFU, ACU, and workflows 905 to run the application. The base application is a simple packet with placeholders for each subsequent file to be downloaded and used by the user. After the base package is downloaded the application is ready for user input 909.

Figure 21:
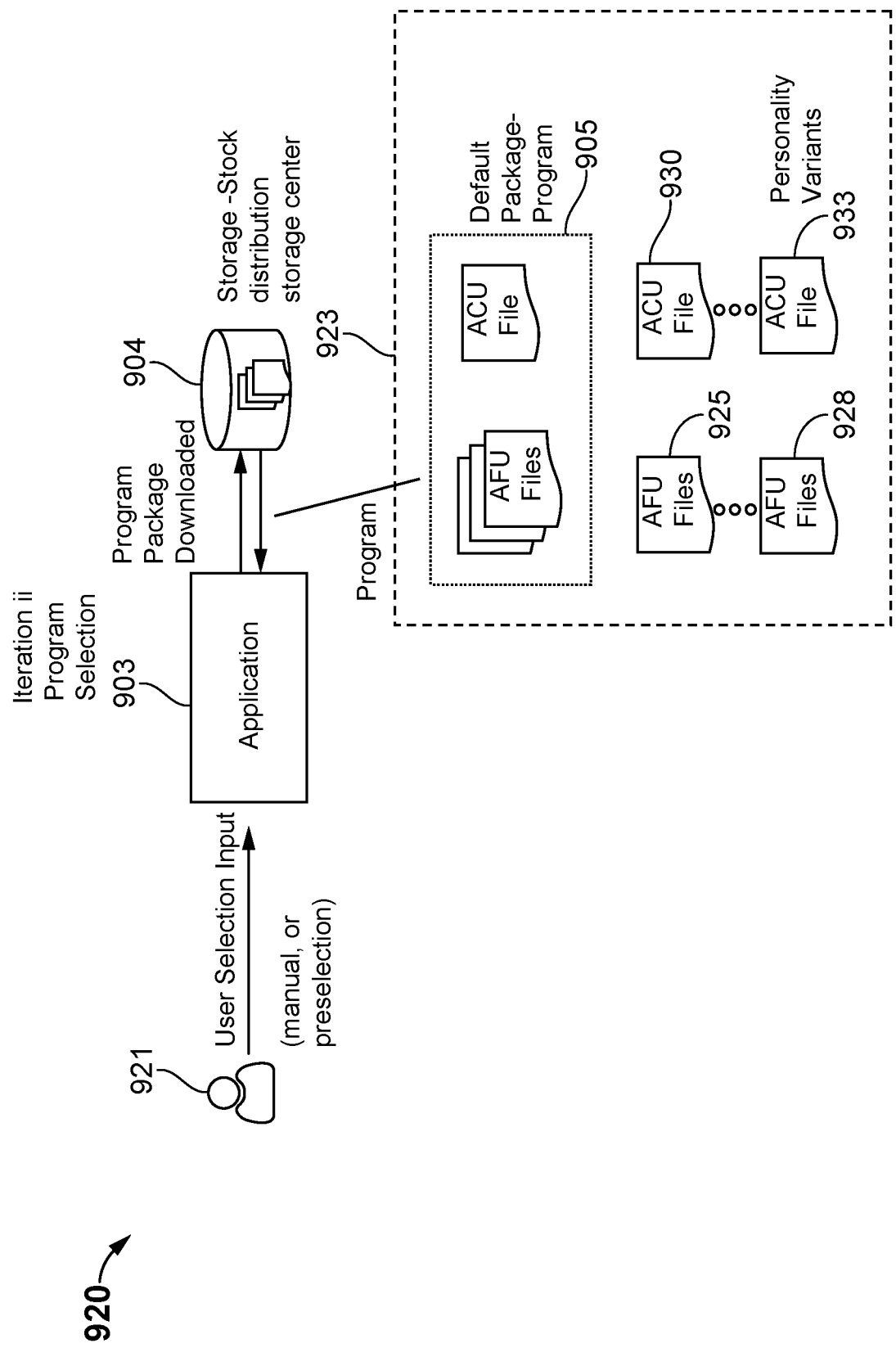
FIG. 21 depicts a basic program selection.

FIG. 21 depicts the program selection for initial personalization of an application, iteration ii 920. The user 921 selects the initial program or input with manual selection or through preselection, and the application 903 takes that information and the program package is downloaded from the stock distribution storage center 904. The program package 923 includes default package programming 905, which includes the default ACU file and AFU files. There are variants on the ACU Files 925, 926, 927, 928 and the AFU files 930, 931, 932, 933 based on personalities of the user. Such personality differences may be based on various analysis such as determined using Meyer-Briggs and similar testing. By way of example, Meyer-Briggs offers 16 personality variants which could be used during the initial personalization of the application 920. Initially, the user 921 can be placed in one of the three most common Meyer-Briggs classification. As the user 921 interacts with the application 903 the personality variants assigned to the user 921 can be refined. As the admin user adds more classifications or variants for a given application or module, the user's association with a variant might change. The sensing data obtained through user interaction with the application will further classify the user until the user is determined to be 1 of the 16 personality types. User data will be used to constantly refine the personality variants presented to user 921. Upon such further association with a variant, the system can send updated ACUs, AFUs, or workflows to provide a more personal experience in line with the user's personality.

Figure 22:
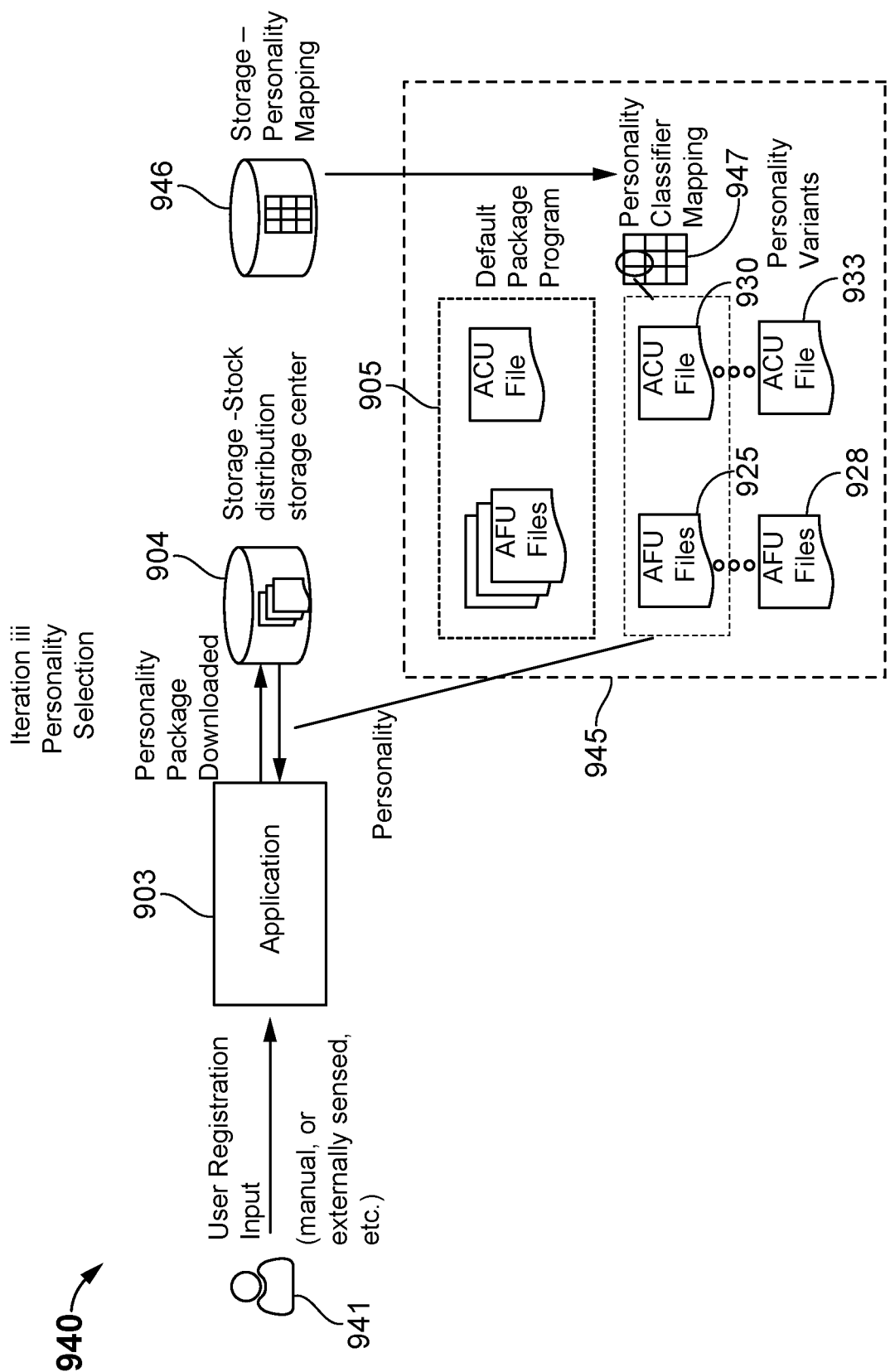
FIG. 22 depicts a personality selection occurring.

FIG. 22 depicts the personality selection or refinement process 940 (iteration iii) of the network. After the initial program selection described in FIG. 21, there is registration/initial personality match-up selection. This is where the present invention improves on known systems. The user registration is input manually, or externally sensed 941 by the application 903. This information is then used to select personality package downloads from the storage-stock distribution storage center 904. The personality variants of the ACU files 925, 926, 927, 928 and AFU files 930, 931, 932, 933 are mapped using personality classifier mapping 947 downloaded from personality mapping storage 946. The personality classifier mapping is based on user responses. The server will review the responses and match particular personalities to the appropriate personality variant ACU files 925, 926, 927, 928 and AFU files 930, 931, 932, 933.

Figure 23:
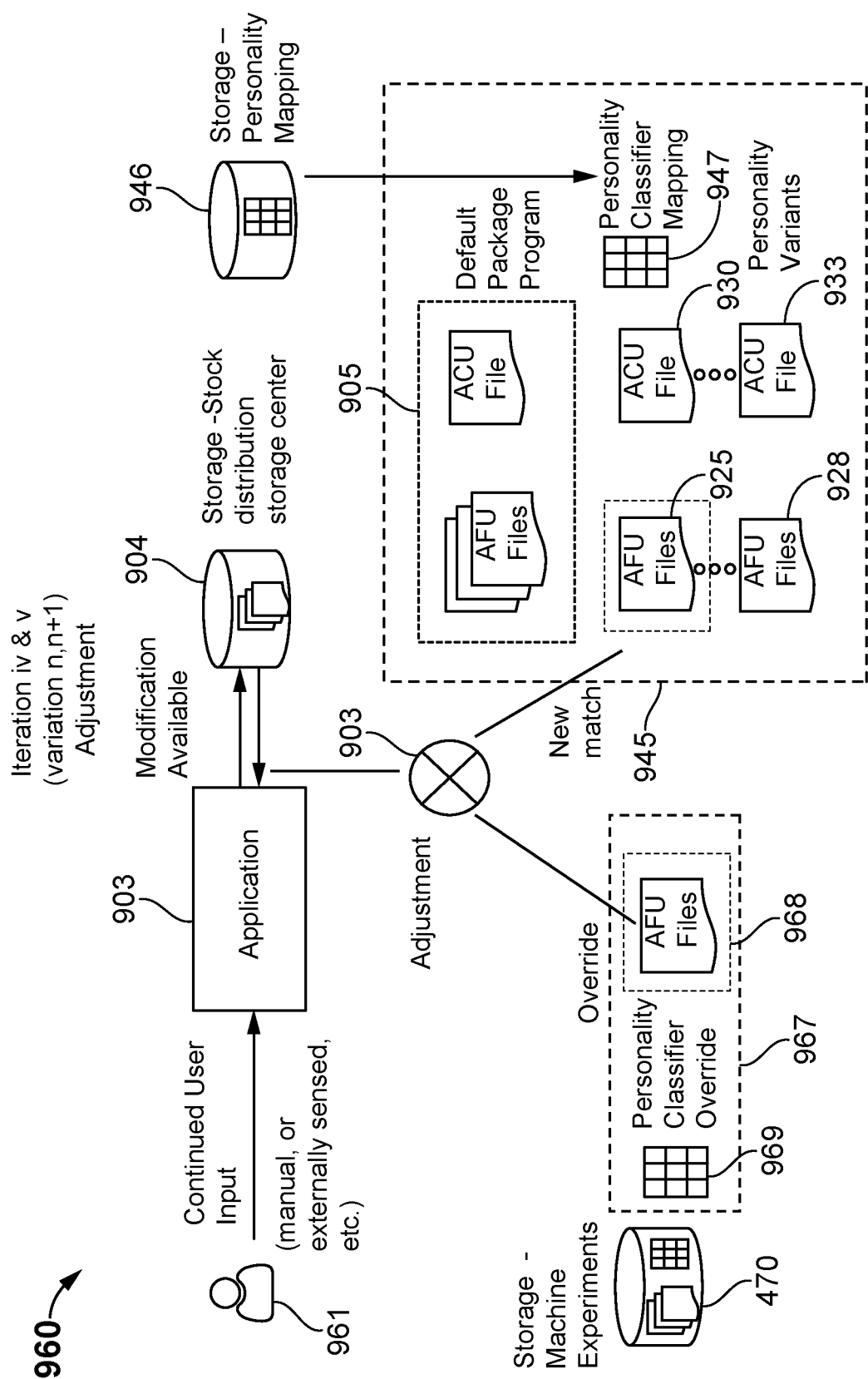
FIG. 23 depicts personality adjustment.

FIG. 23 depicts the adjustment of personality selection done in iteration iv and v 960. After the program is selected and user input is assessed the system allows for regional adjustment to the program without having to download the entire application. The adjustments made to the application can change and shift dynamically as the users uses the app. Presently application usage needs to be paused as an update is installed, the present invention allows the user to continue to use the application as an update is made, as the updates will only refine AFU's not replace AFUs in their entirety. The user 961 continues to use the application 903 and this information/input modifies the application using the stock distribution storage center 904. Adjustments 965 are made to AFUs and ACUs using the personality classifier mapping 947 and machine experimentation 967. Machine experimentation 967 can override personality classifier mapping 947. In machine experimentation 967 specific AFU files 968 are marked with personality classifier override 969. The different machine experimentation 967 are stored in machine experiments storage 970. The machine experimentation 967 targets specific AFU files 968 to allow for the targeted updates that allow continued usage of the device as an update install.

Figure 24:
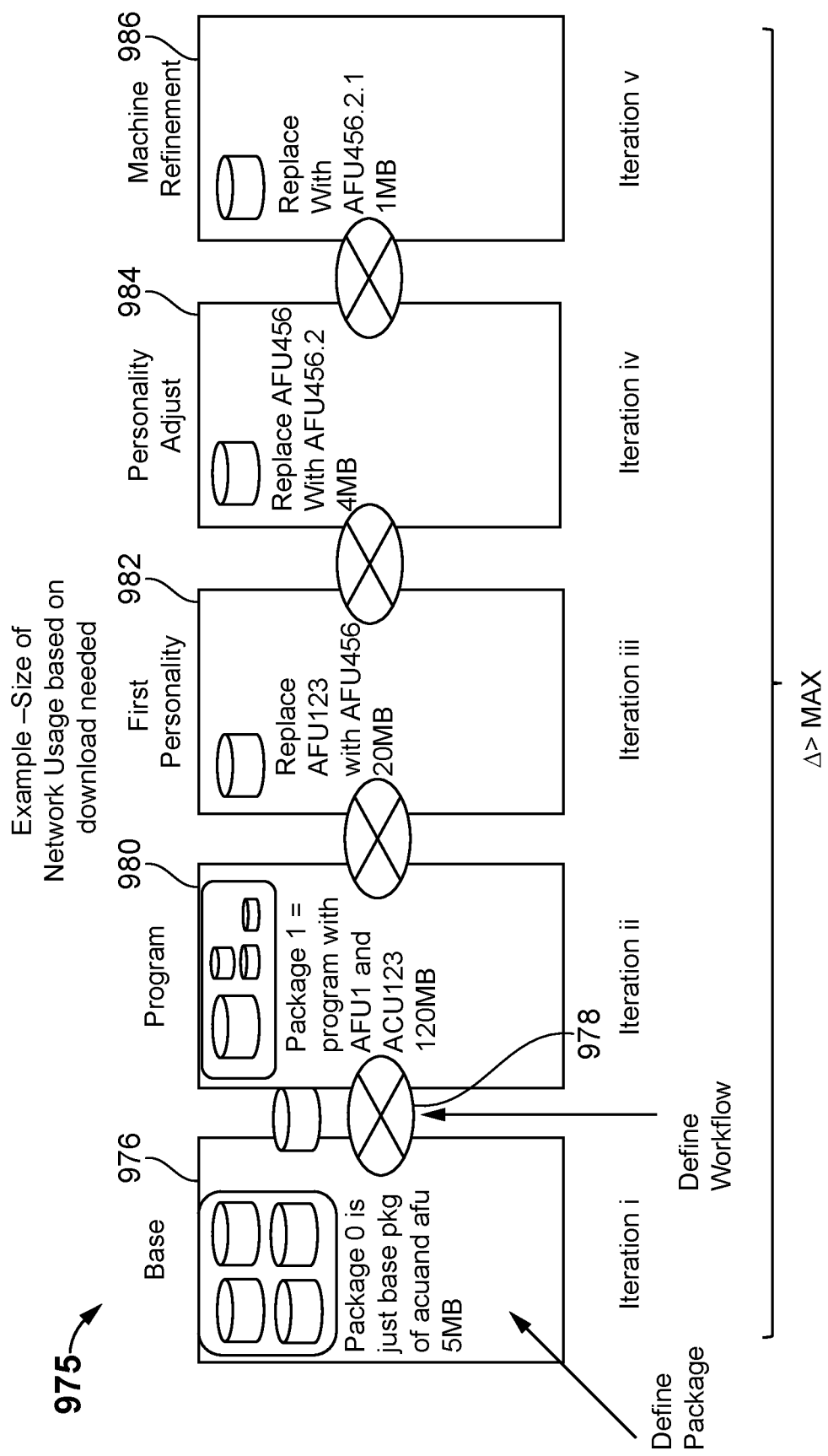
FIG. 24 depicts a breakdown of network usage.

FIG. 24 depicts network usage of the system 975 of the present invention through each iteration based on elements needing to be deployed. Iteration i and Iteration ii are typical of the amount of network usage needed for known or current systems. Iteration iii, iv and v illustrate the network usage and related benefits that occur in the present invention. Iteration i is the base program 976 downloaded from the application storefront. The package is a base package consisting of a skeleton ACU, AFU and workflow.

By way of example, and for illustrating the network usage benefits, the following description will provide standard ranges and indicate a typical scenario, neither of which are intended to limit the scope of the invention. For example, the base package may be in a range of 1-100 MB (i.e. about 5 MB) to meet storefront requirements. Iteration ii is the program 980 downloaded as a whole. The application storefront only allows application makers to upload a skeletal program so as not to take up too much space in the store, and when the user first opens the installed app, the application completes its download. In an exemplary model the application downloads ACU 1 and AFU 123, which may in a range of 50-400 MB (i.e. about 200 MB). Iteration iii is the first personality-based selection 982 of AFUs, and the application begins replacing general AFUs with more user specific AFUs. In the depicted example, the system requires or deploys a packet in a range of about 5 MB to 120 MB, which is only a fraction of the complete application image (i.e. a 20 MB packet deployment instead of an entire application update at 120+MB) since the present invention only needs to replace AFU 123 with AFU 456. Iteration iv depicts the continued personality adjustments, with AFUs being updated with sub-programs (i.e. AFU 456 being refined to AFU 456.2). In the depicted example for iteration iv, the system would only need or require about 20-25% of iteration iii (i.e. 4 MB of the 20 MB example used above) to download. If the update in iteration iii was a larger update (i.e. 60 MB) then the iteration iv update would also be larger but still proportional (i.e. 15 MB). FIG. 24 also depicts, iteration v which shows the machine refinement 986 where AFU 456.2 is replaced with AFU 456.2.1. In this instance, the system would only need to deploy about 20-25% of iteration iv deployment (i.e. about 1 MB of the 4 MB iteration iv deployment). If the update in iteration iv was larger (i.e. 15 Mb) then the iteration v update would also be larger but still fairly proportional (i.e. 4 MB). In between each iteration are workflows 978 which can also be updated and refined. The present invention provides a system and architecture which enables that each subsequent download requires less network usage because updates are selectively done to personality specific ACUs, AFUs, and workflows.

Code Modules

Figure 25:
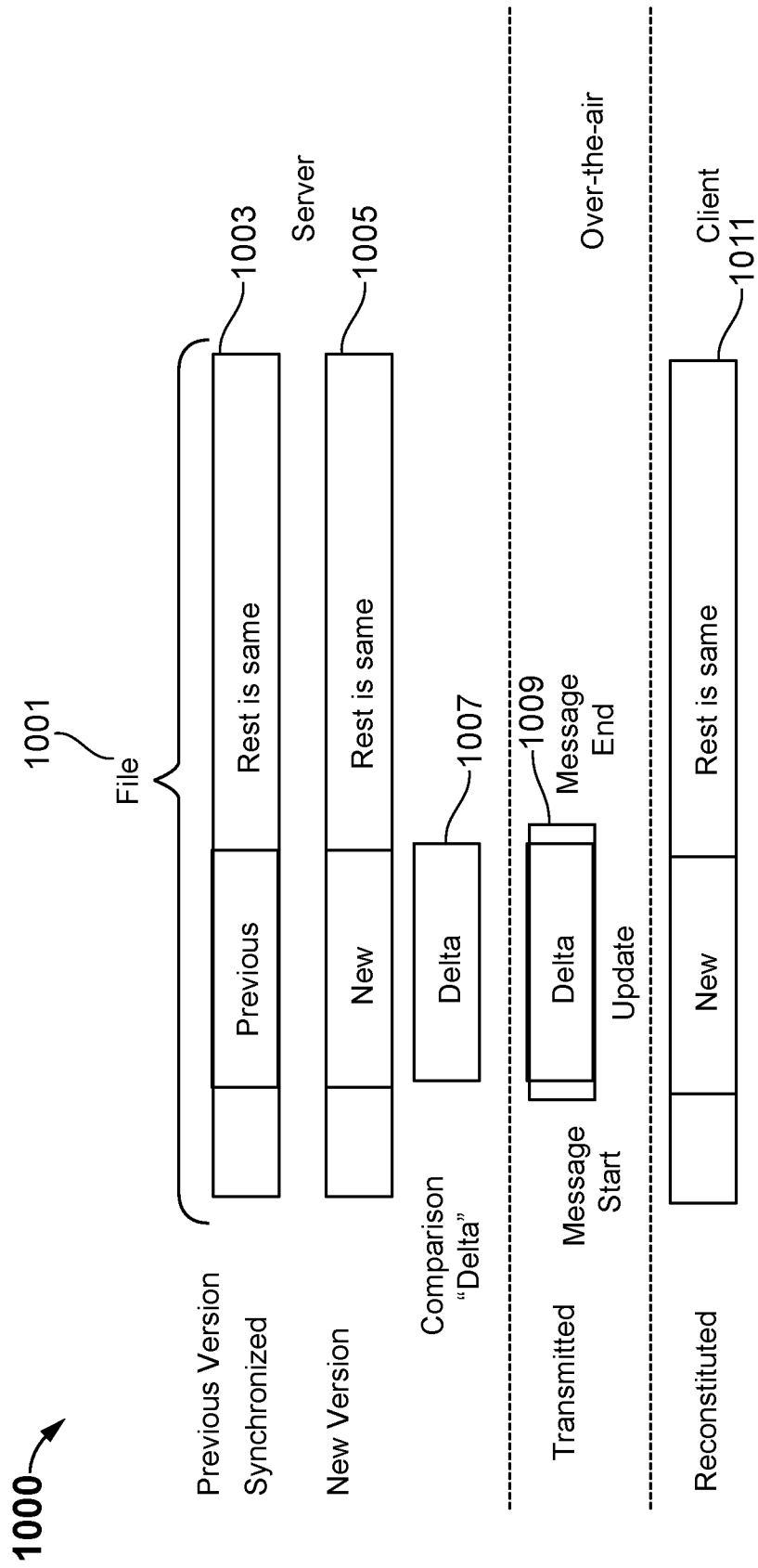
FIG. 25 depicts the encapsulated traffic between the server and the device.

FIG. 25 depicts the encapsulated traffic between the server and the device. Encapsulated traffic is when the server has a view of what the client device is doing and can make changes to specific areas of code on the client device in specific files 1001. The server looks at that previous version synchronized 1003 on the device. Based on changes made by an admin, the machine, or new information based on modules in the server, the previous code is compared with the new version 1005. The server compares the previous application or code and the new code and identifies what is the same and what is different and determined the "delta" 1007. The delta is transmitted with a message start and message end 1009 over a communication path or network. The delta 1007 contains the update and is reconstituted 1011 on the client device, with only the delta section being changed.

Another novel aspect of the present invention is the ability to selectively deploy portions of code for update the application by deploying segmented code portions or code modules without having to update large sections of codes. The present invention is capable of providing a computing device comprising: one or more processors, and one or more computer-readable storage devices for storing instructions that, when executed by the one or more processors, cause the computing device to perform operations comprising: receiving, by the computing device and over a computer network, a set of instructions (i.e. software application) stored on the computer-readable devices, the set of instructions including a plurality of code modules; a first set of code modules, of the plurality of code modules, configured to provide an initial AFU; capturing user interaction data with the application; analyzing the user interaction data; determining a preferred AFU available; retrieving or deploying, from a remote computing device, a select set of code modules added to the plurality of code modules; connecting a second set of code modules configured to provide a second AFU; and updating the application to utilize the second AFU. The present invention can also make use of the same operations and methods to update from a first to second ACU or workflow segment. The ACU, AFU, or workflow could also be updated versions of the original ACU, AFU, or workflow segments instead of alternative containers, features, or workflow segments.

Figure 26:
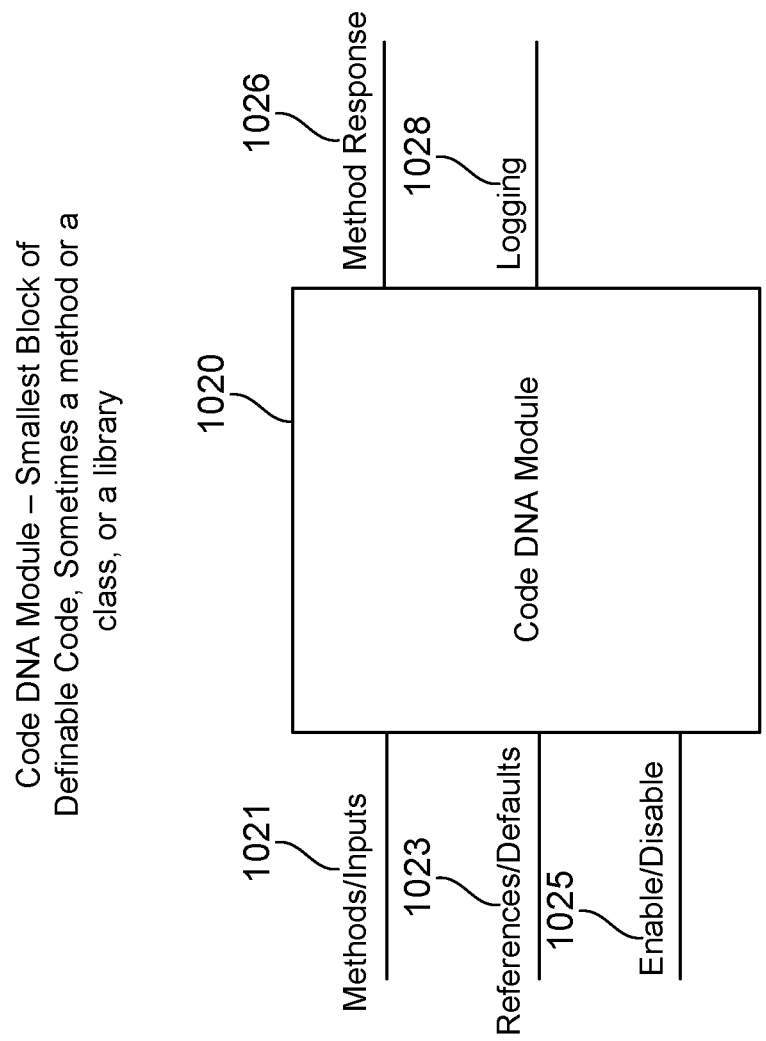
FIG. 26 depicts a code DNA module.

FIG. 26 depicts a code DNA module 1020. DNA relates to the concept of deoxyribonucleic acid or DNA as a reference into how code modules make up the genetic structure of the application and can be combined in many different ways as application fabric to create new uses and purposes of the software for scientific research and user engagements. The code DNA module 1020 is the smallest block of definable code, it may be a method, a code or a library. If a library, it can be third party elements, or code created for a specific reason. In an exemplary embodiment, Code DNA module 1020 is the genetic makeup of the application on the device. The code DNA module 1020 is made up of method/inputs 1021, reference/defaults 1023, enable/disable 1025, logging 1028, and method response 1026. If the code DNA module 1020 is not in use it may remain on the device in a dormant state to be activated as needed. Combining code modules to interact with each other could be by stitching, mending, joining, or coding the modules; or by coding the integration or use of a reference table which pulls or activates the appropriate code modules when needed.

Figure 27:
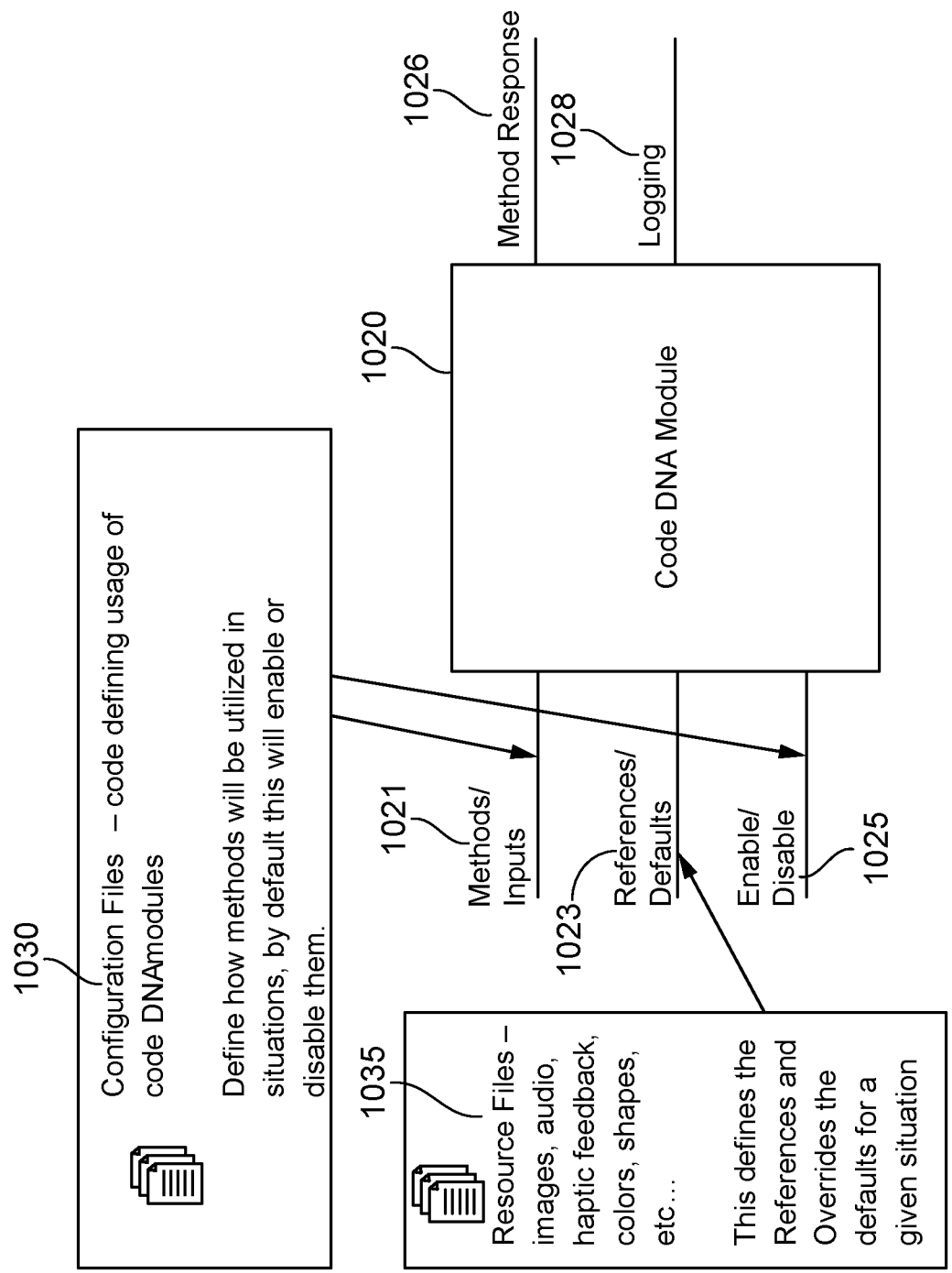
FIG. 27 depicts stitched together code DNA modules their interaction with configuration files and resource files.

FIG. 27 depicts how the code DNA modules 1020 are stitched together in the application and interact with Configuration files 1030 and resource files 1035. The configuration files 1030 are the code defining usage of code DNA modules 1020. The configuration files 1030 define the methods or inputs 1021 for each code module 1020, how the modules 1020 will be utilized, in which situations the code modules will be used. The configuration file or element will enable or disable 1025 the module 1020 based on inputs, application configuration, and sensor or user interaction received by the device. The resource files 1035 are images, audio, haptic feedback, colors, shapes, etc. The resource files 1035 are utilized by the module 1020 through a communication link 1023 and, depending on various inputs, may override the defaults for a given situation. The code modules 1020 may also log 1028 all or certain activities and may be altered or responsive to the method response outputs 1026 which can be further defined as inputs to another different code module 1020 based on interaction defined with Configuration files 1030 and pattern files 1041.

Figure 28:
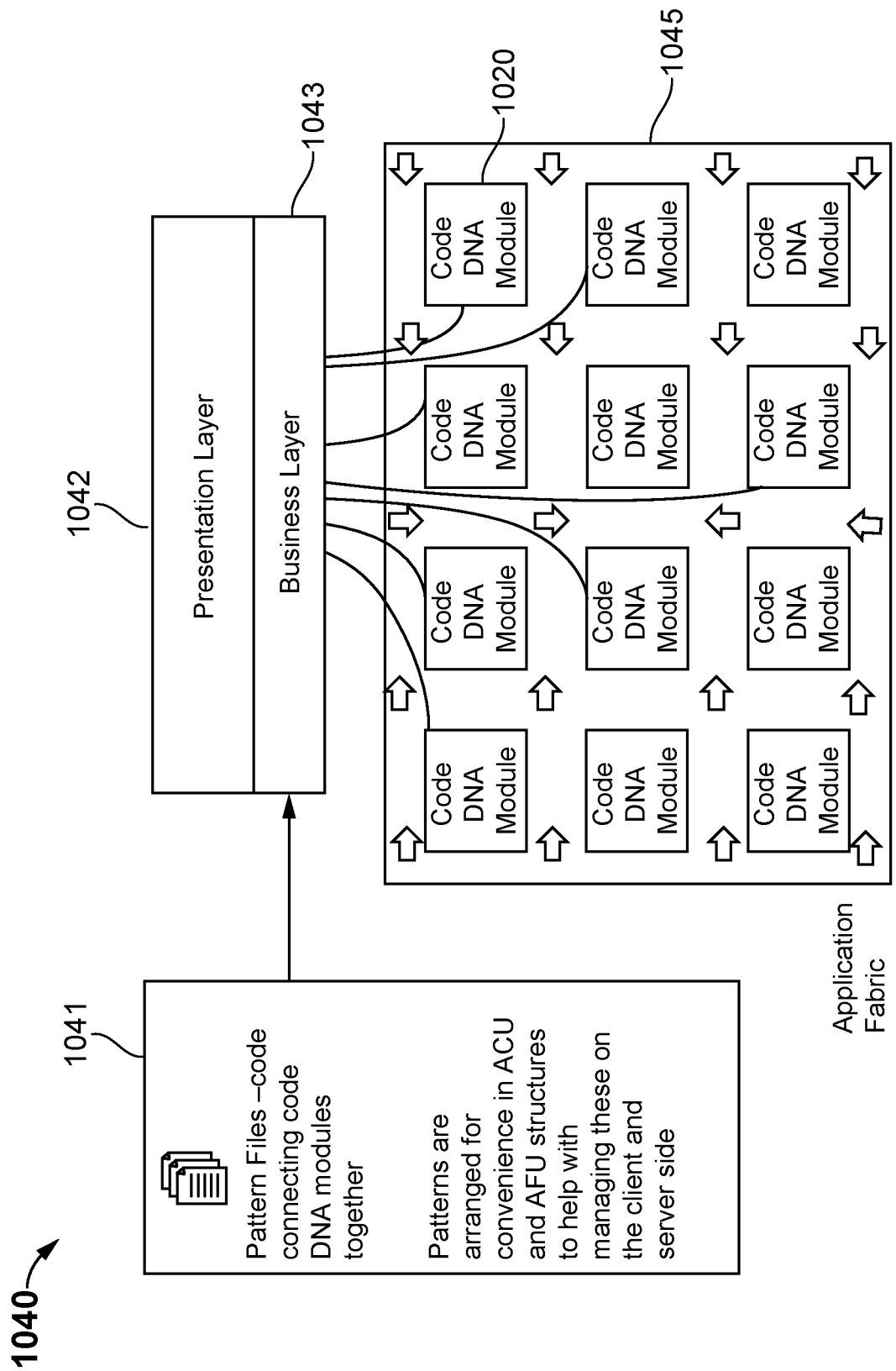
FIG. 28 depicts the pattern files of connected code DNA modules.

FIG. 28 depicts the pattern files 1041, which is code connecting the code DNA modules 1020 together. The business layer 1043 and presentation layer 1042 of the client-side architecture is comprised of pattern files. The pattern files are depicted by Various Code DNA modules 1020 which comprise the application fabric 1045. The patterns are arranged for convenience in ACU and AFU structures to help with managing the code modules 1020 on the client and server side.

Figure 29:
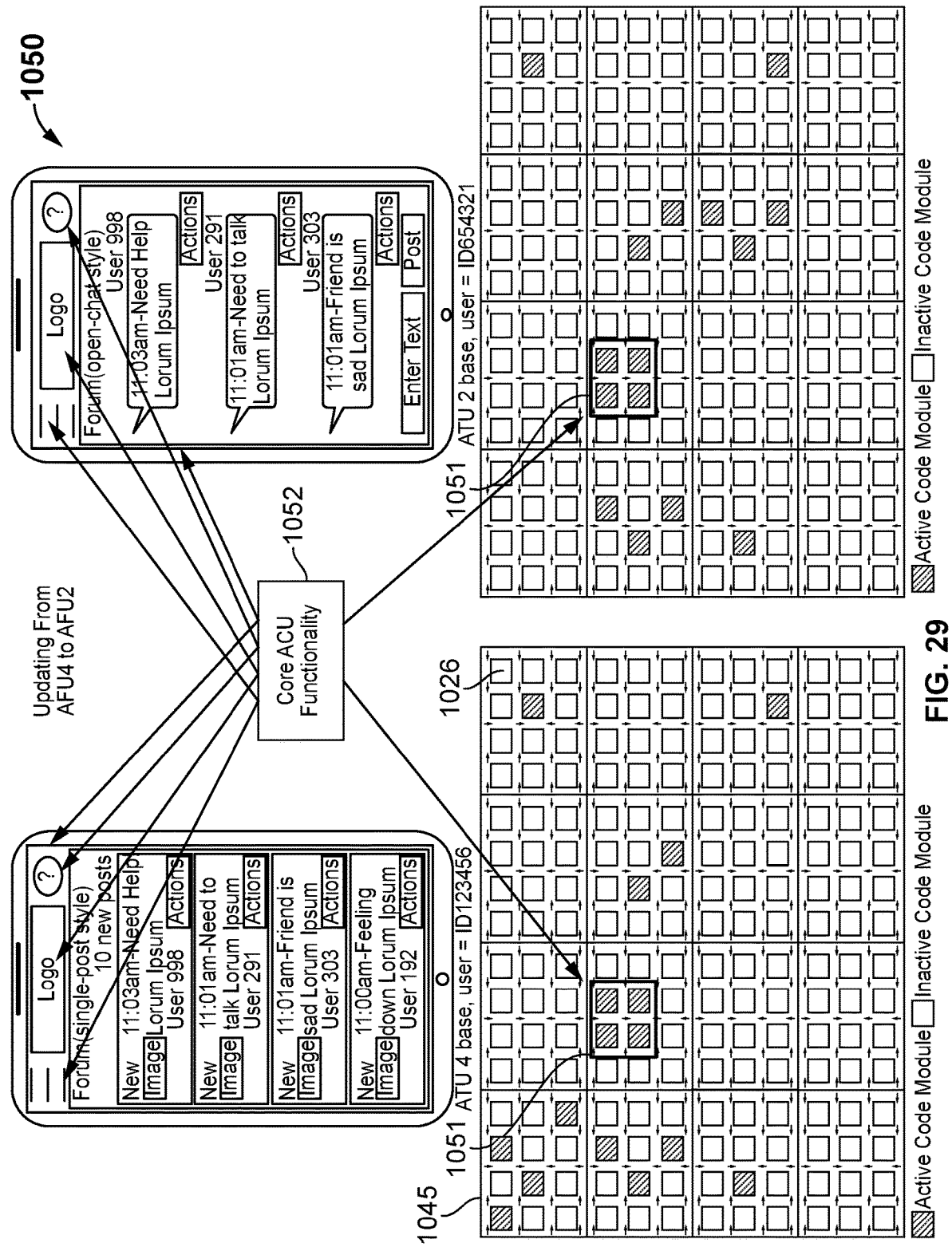
FIG. 29 provides a visualization of an update to an application on device as AFUs are updates using code modules.
Figure 30:
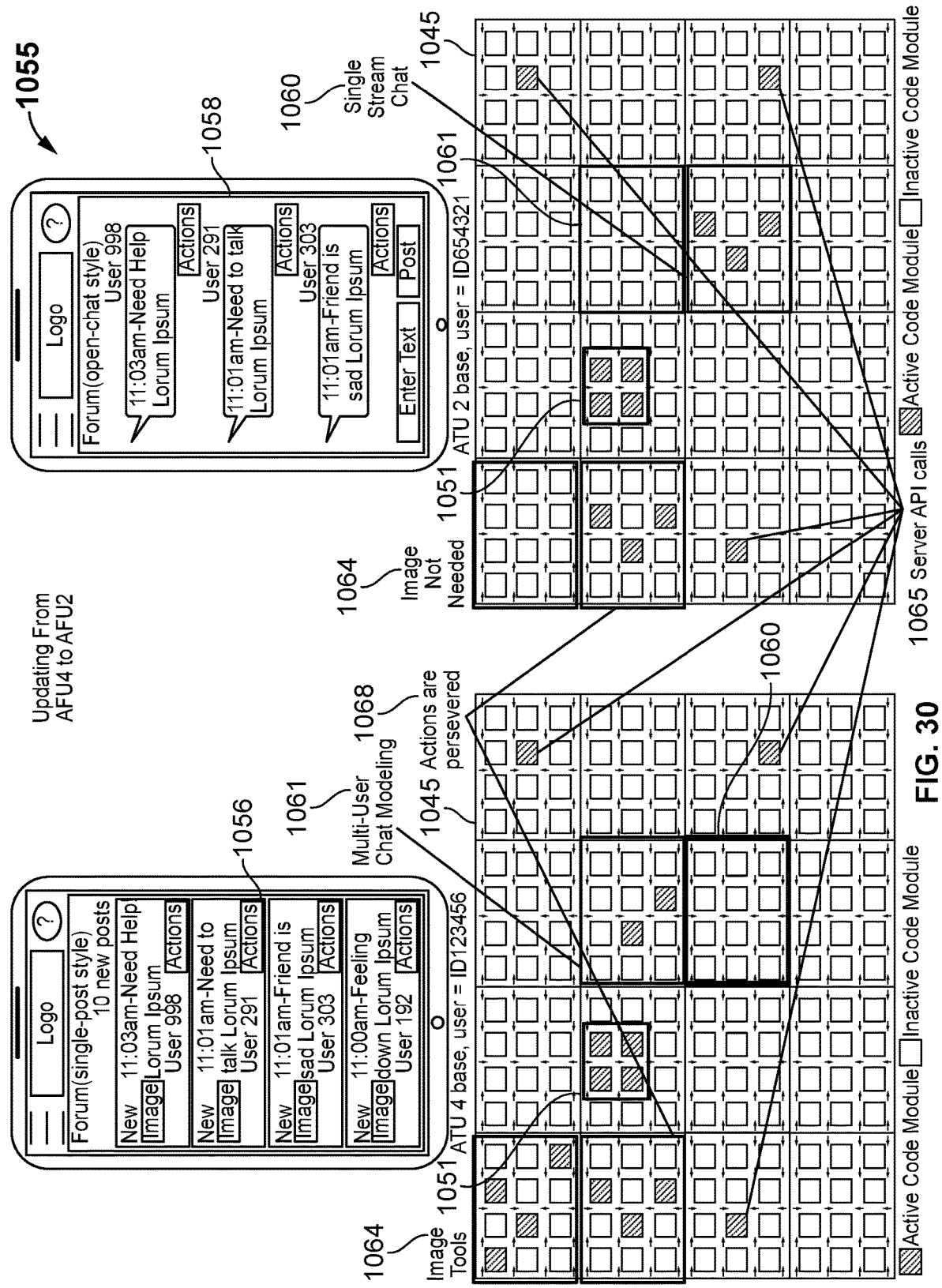
FIG. 30 depicts activated and deactivated code DNA modules of different AFUs.

FIG. 29, in combination with FIG. 30, is a visualization of an update to an application on device as AFUs are updated. The Core ACU Functionality 1052 which highlights some of the similar graphical elements within the application container remain consistent between the current application (on the left side of FIGS. 29 and 30) and the updated application (on the right side of FIGS. 29 and 30). The code DNA modules 1020 are arranged in the application fabric 1045. The activate code modules 1020 are indicated in the application fabric 1045 as cross line patterned blocks while inactive modules are white or blank. Evident in FIG. 29, the block 1051 of code DNA modules 1020, within fabric 1045, for the Core ACU Functionality 1052 are the same on the current application (left) and updated application (right).

FIG. 30 is the depiction of the different code DNA modules 1020 that are activated or deactivated for different AFUs. Specifically, FIG. 30 shows the changes of the application and related code modules 1020 during a chance from AFU4 to AFU2. The code DNA modules 1020 are depicted by a grid of code modules within the code fabric 1045. In the current application (left), AFU 4, which for exemplary purposes is for multi-user chat 1056, is being changed to AFU2, which is for a single stream chat 1058.

Due to the AFU4 to AFU2 change, various features and reference files are modified. For example, image tools 1064 are activated as depicted by a four by four grid of code modules 1020 with four of the code modules 1020 activated. However, in AFU2, the image tools 1064 are no longer needed so the activate modules are deactivated. Further, for example, in AFU2 a multi-user chat function 1061 is more advantageous and is activate, but in AFU4 the system has determined, or the user has selected to interact with a single stream chat function 1060. The current application (left) shows various code DNA module 1020 in the Multi-User Chat modeling block 1061 are activated while the Multi-User Chat Modeling module 1061 is turned off (by deactivating the code modules 1020) in the updated application (right). Similarly, the Single Stream Chat 1060 on the current application (left) contains no active code modules 1020 while the updated application (right) has active code modules 1020 in the Single Stream Chat block 1060. It is important to note that various code modules 1020 within a block (for example—Image tools 1064, Multi-User chat 1061, or Since Stream Chat 1060) are active or inactive as the feature or function can be tailored or personalized in its appearance and functions based on the user's preferences, device limitations, or system determined preferences.

At the same time as the update to AFU4 to AFU2 is taking place, the system does not need to update all blocks or modules 1020. For example, the ACU (block 1051) did not change, nor did the server API Calls 1065, or the Actions 1068, which are all active in both AFU4 and AFU2. By enabling a code module 1020 fabric 1045, the system of the present invention enables individual code modules 1020 to be updated or added as well as blocks of code modules 1020 which might provide completely new features, functions, ACUs, AFUs, or workflows.

The system of the present invention may make use of various identifiers for the code modules or code elements, blocks of code modules, ACUs, AFUs, workflow sets or segments, and users. As depicted in FIG. 14, the ACU and AFUs have programmatic identifiable aspects. Such identifiers may consist of unique identifiers (UIDs) which may have aspects in each UID to identify the element type (ACU, AFU, specific workflow, code module, user element) as well as the location within the application fabric to allow for easier change detection, updating or replacing. Further, the UIDs can be used by the managed configuration element (file, table, code) to identify which elements are active or inactive, such as code module individual configurations and pattern programming which can be used to determine the grouping assignments by which variations of ACUs, AFUs, and workflow segments are considered to be active or inactive. Such UID may be any combination or keywords, numbers, characters, letters, alpha-numeric, or code-based identifiers.

The systems and methods of the invention in described embodiments may be implemented as a system, method, apparatus or article of manufacture using programming and/or engineering techniques related to software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may be further implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In an embodiment of the invention, the systems and methods use networks, wherein, the term, 'networks' means a system allowing interaction between two or more electronic devices and includes any form of inter/intra enterprise environment such as the world wide web, Local Area Network (LAN), Wide Area Network (WAN), Storage Area Network (SAN) or any form of Intranet.

In an embodiment of the invention, the systems and methods can be practiced using any electronic device. An electronic device for the purpose of this invention is selected from any device capable of processing or representing data to a recipient and user and providing access to a network or any system similar to the internet, wherein the electronic device may be selected from but not limited to, personal computers, mobile phones, laptops, palmtops, tablets, portable media players and personal digital assistants.

As noted above, the processing machine used to implement the invention may be a suitable computer or other processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system (OS). Thus, embodiments of the invention may include a processing machine running the Unix operating system, the Apple iOS operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system (such as macOS M), the Apache operating system, an OpenStep™ operating system, the Android M operating system (and variations distributed by Samsung, HTC, Huawei, LG, Motorola, Google, Blackberry, among others), the Windows 10™ operating system, the Windows Phone operating system, the Windows 8™ operating system, Microsoft Windows™ Vista™ operating system, the Microsoft Windows™ XP™ operating system, the Microsoft Windows™ NT™ operating system, the Windows™ 2000 operating system, or another operating system or platform.

The systems and methods of the invention may utilize non-operating systems (aka serverless architecture) as well for distributed processing. In the processing of the invention, services on cloud computing networks leveraging systems like AWS (as offered by Amazon Web Services, Inc.), BlueMix (as offered by IBM), and Microsoft Azure, can perform data collection services using varying technologies that are spun up on demand using tools like Chef to create container-based deployments like Docker, or non-container compute services (e.g. AWS Lambda).

The invention provides real-time analytics processing that requires scale on demand to the recipients and users in the system, in accordance with at least one embodiment of the invention. Such offerings as AWS lambda and Kinesis (as offered by Amazon Web Services, Inc.) are among those that may be used in implementation of the invention. For example, AWS Lambda may be utilized to execute code (to perform processes of the invention) in response to various triggers including data changes, shifts in system state, or particular action taken by recipients and users. Similarly, in an embodiment, the OS (operating system) of the invention might be encapsulated in an EC2 instance (as offered by Amazon Web Services, Inc.) or multiple instances for deployment.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner, such as over a network of over multiple networks. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

Further, multiple applications may be utilized to perform the various processing of the invention. Such multiple applications may be on the same network or adjacent networks, and split between non-cloud hardware, including local (on-premises) computing systems, and cloud computing resources, for example. Further, the systems and methods of the invention may use IPC (interprocess communication) style communication for module level communication. Various known IPC mechanisms may be utilized in the processing of the invention including, for example, shared memory (in which processes are provided access to the same memory block in conjunction with creating a buffer, which is shared, for the processes to communicate with each other), data records accessible by multiple processes at one time, and message passing (that allows applications to communicate using message queues).

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, C #, Objective C, COBOL, dBase, Forth, Fortran, Java, Modula-2, Node.JS, Pascal, Prolog, Python, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "recipient interfaces" or "user interfaces" may be utilized to allow a recipient or user to interface with the processing machine or machines that are used to implement the invention. As used herein, a recipient or user interface includes any hardware, software, or combination of hardware and software used by the processing machine that allows a recipient or user to interact with the processing machine. A recipient or user interface may be in the form of a dialogue screen for example. A recipient or user interface may also include any of a mouse, touch screen, keyboard, voice reader, voice recognizer, dialogue screen, menu box, list, checkbox, toggle switch, a pushbutton or any other device that allows a recipient or user to receive information regarding the operation of the processing machine as it processes a set of instructions and/or provide the processing machine with information. Accordingly, the recipient or user interface is any device that provides communication between a recipient or user and a processing machine. The information provided by the recipient or user to the processing machine through the recipient or user interface may be in the form of a command, a selection of data, or some other input, for example.

As discussed above, a recipient or user interface is utilized by the processing machine that performs a set of instructions such that the processing machine processes data for a recipient or user. The recipient or user interface is typically used by the processing machine for interacting with a recipient or user either to convey information or receive information from the recipient or user. However, it should be appreciated that in accordance with some embodiments of the system and method of the invention, it is not necessary that a human recipient or user interact with a recipient or user interface used by the processing machine of the invention. Rather, it is also contemplated that the recipient or user interface of the invention might interact, i.e., convey and receive information, with another processing machine, rather than a human recipient or user. Accordingly, the other processing machine might be characterized as a recipient or user. Further, it is contemplated that a recipient or user interface utilized in the system and method of the invention may interact partially with another processing machine or processing machines, while also interacting partially with a human recipient or user.

What is claimed is:

1. A computing device comprising: one or more processors; and one or more computer-readable storage devices storing instructions that, when executed by the one or more processors, cause the computing device to perform operations comprising:
    a. receiving, by the computing device and over a computer network, a first set of instructions stored on the computer-readable storage devices, the first set of instructions including an initial application configuration, at least two application container unit files, an application container manager, a plurality of application feature unit files, and a plurality of application workflow segments;
    b. wherein the initial application configuration identifies a first application container unit file from the at least two application container unit files, a first set of application feature unit files from the plurality of application feature unit files, and a first workflow set from the plurality of application workflow segments for the computing device to generate a first user interface;
    c. mapping the at least two application container files using a personality classifier mapping to obtain a personality mapping that associates each application container file with at least one personality variant;
    d. mapping the plurality of application feature unit files using the personality classifier mapping to obtain a personality mapping that associates each of the plurality of application feature unit files with at least one personality variant;
    e. capturing user interaction data with the first user interface generated from the initial application configuration;
    f. analyzing the user interaction data captured with the first user interface generated from the initial application configuration;
    g. building a real-time personality profile from the analysis of the user interaction data;
    h. selecting, by the application container manager, a preferred application container unit file from the at least two application container unit files based on the real-time personality profile and the personality mapping of the application container unit files;
    i. selecting, by an application feature manager, at least one preferred application feature unit file from the plurality of application feature unit files based on the real- time personality profile and the personality mapping of the application feature unit files; and
    j. updating the initial application configuration to a second application configuration using the selected preferred application container unit file and using the selected at least one preferred application feature unit file to generate a second user interface.

2. The computing device of claim 1, wherein the operations further comprise:
    receiving an additional application container unit file from the computer network, and
    updating the second application configuration with the received additional application container unit file when the application container manager selects the received additional application container unit file.

3. The computing device of claim 1, wherein the operations further comprise:

receiving an additional application feature unit file from the computer network; and updating the second application configuration with the received additional application feature unit file when an application feature manager resident on the computing device selects the received additional application feature unit file.

4. The computing device of claim 1, wherein the operations further comprise:

receiving an additional workflow segment from the computer network; and updating the second application configuration with the received additional workflow segment when the application container manager updates the second application configuration to utilize the received additional workflow segment.

5. The computing device of claim 1, wherein the operations further comprise:

receiving an updated version of an application container unit file from the computer network; and updating the second application configuration with the updated version of the application container unit file.

6. The computing device of claim 1, wherein the operations further comprise:

receiving an updated version of an application feature unit file from the computer network; and updating the second application configuration with the updated version of the application feature unit file.

7. The computing device of claim 1, wherein the operations further comprise:

receiving an additional workflow segment from the computer network;

updating the second application configuration with the received additional workflow segment when the application container manager updates the second application configuration to utilize the received additional workflow segment;

receiving an updated version of one of the application workflow segments from the computer network; and updating the second application configuration with the updated version of the application workflow segment.

8. The computing device of claim 1, wherein the application configuration is a subset of code and wherein updating the initial application configuration the application configuration consists of updating the subset of code.

9. The computing device of claim 1, wherein the application configuration is contained within a configuration file and wherein updating the initial application configuration the application configuration consists of updating the configuration file.

10. The computing device of claim 1, wherein the application configuration is contained within a reference table and wherein updating the initial application configuration the application configuration consists of updating the reference table.

11. A method performed by a computer system, the method comprising:

a. transmitting, by the computer system, a software application containing an application configuration, at least two application container unit files, an application container manager, a plurality of application feature unit files and a plurality of workflow segments, to a remote device;

b. assigning, within the application configuration, an initial application container unit file selected from the at least two application container unit files, at least one initial application feature unit file selected from the plurality of application feature unit files, and at least one initial workflow segment selected from the plurality of workflow segments;

c. mapping the at least two application container files using a personality classifier mapping to obtain a personality mapping that associates each application container file with at least one personality variant;

d. mapping the plurality of application feature unit files using the personality classifier mapping to obtain a personality mapping that associates each of the plurality of application feature unit files with the at least one personality variant;

e. capturing, by the remote device, user interaction data during use of the software application on the remote device;

f. analyzing, by the remote device, the user interaction data;

g. building a real-time personality profile of a user based on the analysis of the user interaction data;

h. selecting, by the application container manager, a preferred application container unit file from the at least two application container unit files based on the real-time personality profile and the personality mapping of the application container unit files;

i. selecting, by an application feature manager, at least one preferred application feature unit file from the plurality of application feature unit files based on the real- time personality profile and the personality mapping of the application feature unit files; and j. updating the application configuration to a second application configuration using the selected preferred application container unit file and using the selected at least one preferred application feature unit file to generate a second user interface.

12. The method of claim 11, the method further comprising:

retrieving an additional application container unit file from a computer network; and updating, by the application container manager, the second application configuration to utilize the retrieved additional application container unit file.

13. The method of claim 11, the method further comprising:

retrieving an additional application feature unit file from a computer network and updating the second application configuration, by an application feature manager resident on the remote device, to utilize the retrieved additional application feature unit file.

14. The method of claim 11, the method further comprising:

retrieving an additional workflow set from a computer network and updating the second application configuration to utilize the retrieved additional workflow set.

15. The method of claim 11, the method further comprising: retrieving an updated version of an application container unit file already resident on the remote device from a computer network and updating, by the application container manager, the second application configuration with the updated version of the application container unit file.

16. The method of claim 11, the method further comprising:

retrieving an updated version of an application feature unit file already resident on the remote device from a computer network and updating by an application feature manager resident on the remote device, the second application configuration with the updated version of the application container unit file.

17. The method of claim 11, the method further comprising:
 retrieving an updated version of a workflow set already resident on the remote device from a computer network and updating the second application configuration with the updated version of the workflow set.

18. The method of claim 11, wherein the application configuration is a subset of code and updating the application configuration consists of updating the subset of code.

19. The method of claim 11, wherein the application configuration is contained within a configuration file and updating the application configuration consists of updating the configuration file.

20. The method of claim 11, wherein the application configuration is contained within a reference table and updating the application configuration consists of updating the reference table.

\* \* \* \* \*